(12) United States Patent
Wang et al.

(10) Patent No.: US 9,346,987 B2
(45) Date of Patent: May 24, 2016

(54) ADHESIVE AND SEALING LAYERS FOR ELECTROPHORETIC DISPLAYS

(75) Inventors: Xiaojia Wang, Fremont, CA (US); Cheri Pereira, Fremont, CA (US); Jack Hou, Fremont, CA (US); Rong-Chang Liang, Cupertino, CA (US); Gary Yih-Ming Kang, Fremont, CA (US)

(73) Assignee: E INK CALIFORNIA, LLC, Fremont, CA (US)

( * ) Notice: Subject to any disclaimer, the term of this patent is extended or adjusted under 35 U.S.C. 154(b) by 1103 days.

(21) Appl. No.: 12/485,812

(22) Filed: Jun. 16, 2009
(Under 37 CFR 1.47)

(65) Prior Publication Data

US 2010/0033803 A1 Feb. 11, 2010

Related U.S. Application Data

(63) Continuation-in-part of application No. 11/499,909, filed on Aug. 4, 2006, now Pat. No. 7,572,491, which is a continuation-in-part of application No. 10/762,196, filed on Jan. 21, 2004, now abandoned.

(60) Provisional application No. 60/442,454, filed on Jan. 24, 2003.

(51) Int. Cl.
*C09K 19/00* (2006.01)
*C09J 175/16* (2006.01)
(Continued)

(52) U.S. Cl.
CPC .............. *C09J 175/16* (2013.01); *C08G 18/672* (2013.01); *C08G 18/792* (2013.01); *C09J 167/07* (2013.01);
(Continued)

(58) Field of Classification Search
CPC ........ C09J 175/04; C09J 175/06; C09J 175/08; C09J 175/14; C09J 175/16; C08G 18/10; C08G 2170/40; C08G 2190/00; C08G 18/672; C08G 18/792; G02F 1/167; G02F 1/133305; G02F 1/133377; Y10T 428/1059
USPC .............. 428/1.5, 1.3; 359/237, 238, 296, 253; 204/450, 600; 152/326, 331.4, 331.7, 152/332; 524/589
See application file for complete search history.

(56) References Cited

U.S. PATENT DOCUMENTS 3,281,426 A 10/1966 Van Dyke Tiers
3,612,758 A 10/1971 Evans et al.
(Continued)

FOREIGN PATENT DOCUMENTS

EP 0 305 175 3/1989
EP 1 013 690 6/2002
(Continued)

OTHER PUBLICATIONS

Allen, K. (Oct. 2003). Electrophoretics Fulfilled. *Emerging Displays Review: Emerging Display Technologies, Monthly Report*—Oct. 2003, 9-14.
(Continued)

*Primary Examiner* — Ruiyun Zhang
(74) *Attorney, Agent, or Firm* — Perkins Coie LLP

(57) ABSTRACT

The invention is directed to compositions and methods for improving the physicomechanical and electro-optical properties of an electrophoretic or liquid crystal display and also to semi-finished or finished display panels with improved physicomechanical properties. The invention is further directed to a display device comprising display cells filled with a display fluid and top-sealed with a top-sealing layer, wherein the top-sealing layer has a thickness of less than 10 microns measured at the center area.

18 Claims, 4 Drawing Sheets

(51) Int. Cl.

| | |
|---|---|
| C08G 18/67 | (2006.01) |
| C08G 18/79 | (2006.01) |
| C09J 167/07 | (2006.01) |
| C09J 175/06 | (2006.01) |
| C08L 67/04 | (2006.01) |

(52) U.S. Cl.
CPC ............ *C09J 175/06* (2013.01); *C08G 2190/00* (2013.01); *C08L 67/04* (2013.01); *Y10T 428/1059* (2015.01)

(56) References Cited

U.S. PATENT DOCUMENTS

| | | |
|---|---|---|
| 3,958,199 A | 5/1976 | Berger et al. |
| 3,979,212 A | 9/1976 | Peters et al. |
| 4,135,789 A | 1/1979 | Hall |
| 4,192,762 A | 3/1980 | Osborn |
| 4,680,103 A | 7/1987 | Beilin et al. |
| 4,985,535 A | 1/1991 | Takada et al. |
| 5,071,909 A | 12/1991 | Pappin et al. |
| 5,326,846 A | 7/1994 | Nagai et al. |
| 5,334,690 A | 8/1994 | Schafheutle et al. |
| 5,360,873 A | 11/1994 | Saito et al. |
| 5,410,011 A | 4/1995 | Konishi et al. |
| 5,462,797 A | 10/1995 | Williams et al. |
| 5,490,893 A | 2/1996 | Enlow et al. |
| 5,659,408 A | 8/1997 | Wenyon |
| 5,827,926 A | 10/1998 | Shimizu |
| 5,837,766 A | 11/1998 | Metro et al. |
| 5,908,899 A | 6/1999 | Tahara et al. |
| 5,930,026 A | 7/1999 | Jacobson et al. |
| 5,942,330 A | 8/1999 | Kelley |
| 5,943,113 A | 8/1999 | Ichihashi |
| 5,961,804 A | 10/1999 | Jacobson et al. |
| 6,067,135 A | 5/2000 | Shimizu et al. |
| 6,083,630 A | 7/2000 | Robe |
| 6,092,392 A | 7/2000 | Verlinden et al. |
| 6,118,502 A | 9/2000 | Yamazaki et al. |
| 6,239,896 B1 | 5/2001 | Ikeda |
| 6,254,751 B1 | 7/2001 | Reiter et al. |
| 6,300,932 B1 | 10/2001 | Albert |
| 6,327,072 B1 | 12/2001 | Comiskey et al. |
| 6,353,078 B1 | 3/2002 | Murata et al. |
| 6,400,492 B1 | 6/2002 | Morita et al. |
| 6,452,038 B1 | 9/2002 | Rao et al. |
| 6,512,626 B1 | 1/2003 | Schmidt |
| 6,540,384 B1 | 4/2003 | Rosevear |
| 6,545,797 B2 | 4/2003 | Chen et al. |
| 6,574,034 B1 | 6/2003 | Lin et al. |
| 6,672,921 B1 | 1/2004 | Liang et al. |
| 6,741,386 B2 | 5/2004 | Minami |
| 6,750,844 B2 | 6/2004 | Nakanishi |
| 6,753,067 B2 | 6/2004 | Chen et al. |
| 6,788,449 B2 | 9/2004 | Liang et al. |
| 6,795,138 B2 | 9/2004 | Liang et al. |
| 6,816,146 B2 | 11/2004 | Harada et al. |
| 6,831,769 B2 | 12/2004 | Holman et al. |
| 6,864,875 B2 | 3/2005 | Drzaic et al. |
| 6,930,818 B1 | 8/2005 | Liang et al. |
| 6,933,098 B2 | 8/2005 | Chan-Park et al. |
| 6,982,178 B2 | 1/2006 | LeCain et al. |
| 7,005,468 B2 | 2/2006 | Zang et al. |
| 7,141,279 B2 | 11/2006 | Liang et al. |
| 7,166,182 B2 | 1/2007 | Pereira et al. |
| 7,560,004 B2 | 7/2009 | Pereira et al. |
| 7,572,491 B2 | 8/2009 | Wang et al. |
| 2001/0003755 A1 | 6/2001 | Fiori et al. |
| 2002/0008898 A1 | 1/2002 | Katase |
| 2002/0131147 A1 | 9/2002 | Paolini et al. |
| 2002/0188053 A1 | 12/2002 | Zang et al. |
| 2003/0124357 A1* | 7/2003 | Kagerer et al. ............ 428/422.8 |
| 2004/0085619 A1 | 5/2004 | Wu et al. |
| 2004/0120024 A1 | 6/2004 | Chen et al. |
| 2004/0219306 A1 | 11/2004 | Wang et al. |
| 2005/0035941 A1 | 2/2005 | Albert et al. |
| 2007/0035497 A1 | 2/2007 | Chen et al. |

FOREIGN PATENT DOCUMENTS

| | | |
|---|---|---|
| WO | WO 01/67170 | 9/2001 |
| WO | WO 0177200 A1 * | 10/2001 |
| WO | WO 02/01281 | 1/2002 |
| WO | WO 02/065215 | 8/2002 |

OTHER PUBLICATIONS

Alliger, G., and Sjothun, I.J., "Vulcanization of Elastomers", 1978, Robert E. Krieger Publishing Co.

Bayer Material Science Product Data Sheets: Desmodur Z 4470 BA (p. 1), Nov. 3, 2005.

Bayer Material Science Product Data Sheets: Desmodur Z 4470 SN (p. 1), Nov. 3, 2005.

Bicerano, J. (2002) "Prediction of Polymer Properties" $3^{rd}$ edition, Marcel Dekker, Inc.

Blow, C.M. and Hepburn, C., "Rubber Technology and Manufacture" 1982, Butterworth Scientific.

Brydson, J.A. editor, "Robber Chemistry", 1978, Applied Science Publishers.

Chaug, Y.S., Haubrich, J.E., Sereda, M. and Liang, R.C. (Apr. 2004). Roll-to-Roll Processes for the Manufacturing of Patterned Conductive Electrodes on Flexible Substrates. *Mat. Res. Soc. Symp. Proc.*, vol. 814, I9.6.1.

Chen, S.M. (Jul. 2003) The Applications for the Revolutionary Electronic Paper Technology. *OPTO News & Letters*, 102, 37-41. (in Chinese, English abstract attached).

Chen, S.M. (May 2003) The New Applications and the Dynamics of Companies. *TRI*. 1-10. (in Chinese, English abstract attached).

Chung, J., Hou, J., Wang, W., Chu, L.Y., Yao, W., & Liang, R.C. (Dec. 2003). Microcup(R) Electrophoretic Displays, Grayscale and Color Rendition. *IDW*, AMD2/EP1-2, 243-246.

Engineeringtalk (Huntsman polyurethanes), *Thermoplastic Polyurethanes Meet Diverse Needs*, pp. 1-2, copy rihgt 2000-2005, http://www.engineeringtalk.com/news/hus/hus100.html downloaded Apr. 25, 2006.

Hartshorn, S.R., editor, "Structural Adhesives, Chemistry and Technology", 1986, Plenum Press.

Ho, Andrew. (Nov. 2006) *Embedding e-Paper in Smart Cards, Pricing Labels & Indicators*. Presentation conducted at Smart Paper Conference Nov. 15-16, 2006, Atlanta, GA, USA.

Ho, C.,& Liang, R.C. (Dec. 2003). *Microcup (R) Electronic Paper by Roll-to-Roll Manufacturing Processes*. Presentation conducted at FEG, Nei-Li, Taiwan.

Ho, Candice. (Feb. 1, 2005) *Microcupt® Electronic Paper Device and Applicaiton*. Presentation conducted at USDC 4th Annual Flexible Display Conference 2005.

Hopper, M.A. & Novotny, V., (1979) IEEE Trans. Electr. Dev., 26(8), 1148-1152.

Hou, J., Chen, Y., Li, Y., Weng, X., Li, H. and Pereira, C. (May 2004). Reliability and Performance of Flexible Electrophoretic Displays by Roll-to-Roll Manufacturing Processes. *SID Digest*, 32.3, 1066-1069.

Kao, WC., (Feb. 2009) Configurable Timing Controller Design for Active Matrix Electrophoretic Dispaly. *IEEE Transactions on Consumer Electronics*, 2009, vol. 55, Issue 1, pp. 1-5.

Kao, WC., Fang, CY., Chen, YY., Shen, MH., and Wong, J. (Jan. 2008) Integrating Flexible Electrophoretic Display and One-Time Password Generator in Smart Cards. *ICCE 2008 Digest of Technical Papers*, P4-3. (Int'l Conference on Consumer Electronics, Jan. 9-13, 2008).

Kao, WC., Ye, JA., and Lin, C. (Jan. 2009) Image Quality Improvement for Electrophoretic Displays by Combining Contrast Enhancement and Halftoning Techniques. *ICCE 2009 Digest of Technical Papers*, 11.2-2.

Kao, WC., Ye, JA., Chu, MI., and Su, CY. (Feb. 2009) Image Quality Improvement for Electrophoretic Displays by Combining Contrast Enhancement and Halftoning Techniques. *IEEE Transactions on Consumer Electronics*, 2009, vol. 55, Issue 1, pp. 15-19.

(56) References Cited

OTHER PUBLICATIONS

Kao, WC., Ye, JA., Lin, FS., Lin, C., and Sprague, R. (Jan. 2009) Configurable Timing Controller Design for Active Matrix Electrophoretic Display with 16 Gray Levels. *ICCE 2009 Digest of Technical Papers*, 10.2-2.

Ku, C. C. & Liepins, R. (1987) "Electrical Properties of Polymers", Hanser Publishers.

Lee, H. and Neville, K., "Handbook of Epoxy Resins", 1967, McGrow-Hill.

Lee, H., & Liang, R.C. (Jun. 2003) SiPix Microcup(R) Electronic Paper—An Introduction. *Advanced Display*, 37, 4-9 (in Chinese, English abstract attached).

Liang, R.C. (Feb. 2003) *Microcup(R) Electrophoretic and Liquid Crystal Displays by Roll-to-Roll Manufacturing Processes*. Presentation conducted at the Flexible Microelectronics & Displays Conference of U.S. Display Consortium, Phoenix, Arizona, USA.

Liang, R.C. (Apr. 2004). *Microcup Electronic Paper by Roll-to-Roll Manufacturing Process*. Presentation at the Flexible Displays & Electronics 2004 of Intertech, San Fransisco, California, USA.

Liang, R.C. (Oct. 2004) *Flexible and Roll-able Displays/Electronic Paper—A Technology Overview*. Paper presented at the METS 2004 Conference in Taipie, Taiwan.

Liang, R.C., & Tseng, S. (Feb. 2003). *Microcup(R) LCD, An New Type of Dispersed LCD by a Roll-to-Roll Manufacturing Process*. Paper presented at the IDMC, Taipei, Taiwan.

Liang, R.C., (Feb. 2005) *Flexible and Roll-able Displays/Electronic Paper—A Brief Technology Overview*. Flexible Display Forum, 2005, Taiwan.

Liang, R.C., Hou, J., & Zang, H.M. (Dec. 2002) Microcup Electrophoretic Displays by Roll-to-Roll Manufacturing Processes. *IDW*, EP2-2, 1337-1340.

Liang, R.C., Hou, J., Chung, J., Wang, X., Pereira, C., & Chen, Y. (2003). Microcup(R) Active and Passive Matrix Electrophoretic Displays by a Roll-to-Roll Manufacturing Processes. *SID Digest*, 20.1.

Liang, R.C., Hou, J., Zang, H.M., & Chung, J. (Feb. 2003). *Passive Matrix Microcup(R) Electrophoretic Displays*. Paper presented at the IDMC, Taipei, Taiwan.

Liang, R.C., Hou, J., Zang, H.M., Chung, J., & Tseng, S. (2003). Microcup(R) displays : Electronic Paper by Roll-to-Roll Manufacturing Processes. *Journal of the SID*, 11(4), 621-628.

Liang, R.C., Zang, H.M., Wang, X., Chung, J. & Lee, H., (Jun./Jul. 2004) "Format Flexible Microcup® Electronic Paper by Roll-to-Roll Manufacturing Process", Presentation conducted at the 14th FPD Manufacturing Technology Expo & Conference.

Nikkei Microdevices. (Dec. 2002) Newly-Developed Color Electronic Paper Promises—Unbeatable Production Efficiency. *Nikkei Microdevices*, 3. (in Japanese, with English translation).

Walker, B.M. editor, "Handbook of Thermoplastic Elastomers", 1979, Van Nostrand Reinhold Co.

Wang, X., Kiluk, S., Chang, C., & Liang, R.C. (Feb. 2004). Mirocup® Electronic Paper and the Converting Processes. *ASID*, 10.1.2-26, 396-399, Nanjing, China.

Wang, X., Kiluk, S., Chang, C., & Liang, R.C., (Jun. 2004) Microcup® Electronic Paper and the Converting Processes. *Advanced Display*, Issue 43, 48-51 (in Chinese, with English abstract).

Wang, X., Li, P., Sodhi, D., Xu, T. and Bruner, S. et al., (Feb. 2006) *Inkjet Fabrication of Multi-Color Microcup® Electrophorectic Display*. the Flexible Microelectronics & Displays Conference of U.S. Display Consortium.

Wang, X., Zang, HM., and Li, P. (Jun. 2006) Roll-to-Roll Manufacturing Process for Full Color Electrophoretic film. *SID Digest*, 00pp. 1587-1589.

Zang, H.M, Hwang, J.J., Gu, H., Hou, J., Weng, X., Chen, Y., et al. (Jan. 2004). Threshold and Grayscale Stability of Microcup (R) Electronic Paper. *Proceeding of SPIE—IS&T Electronic Imaging, SPIE* vol. 5289, 102-108.

Zang, H.M. & Hou, Jack, (Feb. 2005) *Flexible Microcup® EPD by RTR Process*. Presentation conducted at $2^{nd}$ Annual Paper-Like Displays Conference, Feb. 9-11, 2005, St. Pete Beach, Florida.

Zang, H.M. (Oct. 2003). *Microcup (R) Electronic Paper by Roll-to-Roll Manufacturing Processes*. Presentation conducted at the Advisory Board Meeting, Bowling Green State University, Ohio, USA.

Zang, H.M. (Feb. 2004). *Microcup Electronic Paper*. Presentation conducted at the Displays & Microelectronics Conference of U.S. Display Consortium, Phoenix, Arizona, USA.

Zang, H.M., & Liang, R.C. (2003) Microcup Electronic Paper by Roll-to-Roll Manufacturing Processes. *The Spectrum*, 16(2), 16-21.

Zang, HM., (Feb. 2007) *Developms in Microcup® Flexible Displays*. Presentation conducted at the 6th Annual Flexible Display and Microelectronics Conference, Phoenix, AZ Feb. 6-8.

Zang, HM., (Sep. 2006) *Monochrome and Area Color Microcup® EPDs by Roll-to-Roll Manufacturing Process*. Presentation conducted at the Forth Organic Electronics Conference and Exhibition (OEC-06), Sep. 25-27, 2006, Frankfurt, Germany.

Zang, HM., Wang, W., Sun, C., Gu, H., and Chen, Y. (May 2006) Monochrome and Area Color Microcup® EPDs by Roll-to-Roll Manufacturing Processes. *ICIS '06 International Congress of Imaging Science Final Program and Proceedings*, pp. 362-365.

\* cited by examiner

ADHESIVE AND SEALING LAYERS FOR ELECTROPHORETIC DISPLAYS

This application is a continuation-in-part of U.S. application Ser. No. 11/499,909, filed Aug. 4, 2006 now U.S. Pat. No. 7,572,491, which is a continuation-in-part of U.S. application Ser. No. 10/762,196, filed Jan. 21, 2004 now abandoned, which claims benefit of U.S. Provisional Applications No. 60/442,454, filed Jan. 24, 2003, the whole contents of all applications referred to above are incorporated into this application by reference.

BACKGROUND OF THE INVENTION

1. Field of the Invention

The invention is directed to compositions and methods for improving the physicomechanical properties and contrast ratio of displays and also to semi-finished and finished display panels having improved physicomechanical properties and their manufacture.

2. Description of Related Art

The electrophoretic display (EPD) is a non-emissive device based on the electrophoresis phenomenon of charged pigment particles suspended in a solvent. It was first proposed in 1969. The display usually comprises two plates with electrodes placed opposing each other, separated by spacers. One of the electrodes is usually transparent. An electrophoretic fluid composed of a colored solvent with charged pigment particles dispersed therein is enclosed between the two plates. When a voltage difference is imposed between the two electrodes, the pigment particles migrate to one side or the other causing either the color of the pigment particles or the color of the solvent being seen from the viewing side.

There are several different types of EPDs. In the partition type EPD (see M. A. Hopper and V. Novotny, IEEE Trans. Electr. Dev., 26(8): 1148-1152 (1979)), there are partitions between the two electrodes for dividing the space into smaller cells in order to prevent undesired movement of particles, such as sedimentation. The microcapsule type EPD (as described in U.S. Pat. Nos. 5,961,804 and 5,930,026) has a substantially two dimensional arrangement of microcapsules each having therein an electrophoretic composition of a dielectric fluid and a suspension of charged pigment particles that visually contrast with the dielectric solvent. Another type of EPD (see U.S. Pat. No. 3,612,758) has electrophoretic cells that are formed from parallel line reservoirs. The channel-like electrophoretic cells are covered with, and in electrical contact with, transparent conductors. A layer of transparent glass from which side the panel is viewed overlies the transparent conductors.

An improved EPD technology is disclosed in U.S. Pat. Nos. 6,930,818, 6,672,921, 6,933,098, 6,545,797 and 7,005,468, and US Publication Nos. US 2004-0085619 and 2004-0112525, all of which are incorporated herein by reference.

A typical microcup-based display cell is shown in FIG. 1. The cell (10) is partitioned by walls (10b) into subcells or microcups (10a) and sandwiched between a first electrode layer (11) and a second electrode layer (12), at least one of which is transparent. A primer layer (13) is optionally present between the cell (10) and the first electrode layer (11). The subcells or microcups (10a) are filled with an electrophoretic fluid comprising pigment particles (10c) dispersed in a dielectric solvent (10d). The filled microcups are sealed with a sealing layer (14) and laminated with the second electrode layer (12), optionally with an adhesive (15). In the case of in-plane switching EPDs, both in-plane electrodes may be on the same side of the EPD and one of the electrode layers mentioned above may be replaced by an insulating substrate.

The display panel may be prepared by microembossing or photolithography as disclosed in U.S. Pat. No. 6,930,818. In the microembossing process, an embossable composition is coated onto the conductor side of the first electrode layer (11) and embossed under pressure and/or heat to produce an array of microcups.

The embossable composition may comprise a thermoplastics, thermoset or a precursor thereof which may be selected from the group consisting of multifunctional acrylates or methacrylates, vinylbenzenes, vinylethers, epoxides, oligomers or polymers thereof, and the like. Multifunctional acrylates and oligomers thereof are the most preferred. A combination of a multifunctional epoxide and a multifunctional acrylate is also very useful to achieve desirable physicomechanical properties. A crosslinkable oligomer imparting flexibility, such as an urethane acrylate or polyester acrylate, is usually also added to improve the flexure resistance of the microcups. The composition may contain an oligomer, a monomer, additives and optionally a polymer. The glass transition temperature (Tg) for the embossable composition usually ranges from about −70° C. to about 150° C., preferably from about −45° C. to about 50° C.

The microembossing process is typically carried out at a temperature higher than the Tg of the embossable composition. A heated male mold or a heated housing substrate against which the mold presses may be used to control the microembossing temperature and pressure.

The mold is released during or after the embossable composition is hardened to reveal the subcells or microcups (10a). The hardening of the embossable composition may be accomplished by cooling, solvent evaporation, cross-linking by radiation, heat or moisture. If the curing of the embossable composition is accomplished by UV radiation, UV may radiate onto the thermoplastic, thermoset or precursor layer through the transparent conductor layer. Alternatively, UV lamps may be placed inside the mold. In this case, the mold must be transparent to allow the UV light to radiate through the pre-patterned male mold on to the embossable composition.

A thin primer layer (13) is optionally precoated onto the electrode layer (11) to improve the release properties of the mold and the adhesion between the subcells or microcups (10a) and the electrode layer (11). The composition of the primer layer may be the same or different from the embossing composition.

In general, the dimension of each individual microcups or subcells may be in the range of about $10^2$ to about $10^6$ $\mu m^2$, preferably from about $10^3$ to about $5 \times 10^4$ $\mu m^2$. The depth of the cells is in the range of about 3 to about 100 microns, preferably from about 10 to about 50 microns. The ratio between the area of opening to the total area is in the range of from about 0.05 to about 0.95, preferably from about 0.4 to about 0.9. The width of the openings usually are in the range of from about 15 to about 500 microns, preferably from about 25 to about 300 microns, from edge to edge of the openings.

The microcups are filled with an electrophoretic fluid and top-sealed by one of the methods as disclosed in U.S. Pat. Nos. 6,930,818 and 7,005,468, the contents of which are incorporated herein by reference. For example, it may be accomplished by a two-pass method involving overcoating the filled microcups with a top-sealing composition comprising a solvent and a top-sealing material. The top-sealing composition is essentially incompatible with the electrophoretic fluid and has a specific gravity no greater than that of the electrophoretic fluid. Upon solvent evaporation, the sealing composition forms a conforming seamless seal on top of the electrophoretic fluid. The top-sealing layer may be further hardened by heat, radiation, e-beam or other curing methods. Sealing with a composition comprising a thermoplastic elastomer is particularly preferred. Alternatively, the top-sealing may be accomplished by a one-pass method in which the sealing composition is dispersed in an electrophoretic fluid and together with the electrophoretic fluid is filled into the microcups. The top-sealing composition is essentially incompatible with the electrophoretic fluid and is lighter than the electrophoretic fluid. Upon phase separation and solvent evaporation, the top-sealing composition floats to the top of the electrophoretic fluid and forms a seamless sealing layer thereon. The top-sealing layer may be further hardened by heat, radiation or other curing methods.

The top-sealed microcups finally are laminated with the second electrode layer (12) optionally pre-coated with an adhesive layer (15).

Transmissive or reflective liquid crystal displays may also be prepared by the microcup technology as disclosed in U.S. Pat. No. 6,795,138 and US Publication No. 2004-0170776 (now U.S. Pat. No. 7,141,279), the contents of which are incorporated herein by reference.

The displays prepared from the microcup and top-sealing technologies represent a significant advancement in the field of display technology. The microcup-based display may have an adhesive layer and a sealing layer and most of the commonly used adhesives may exhibit a strong capacitor effect. The use of a hydrophilic adhesive or addition of a conductive additive in the adhesive may alleviate the problems associated with the capacitor effect, but these possible remedies often result in setbacks such as sensitivity to humidity, undesirable current leakage or short circuitry.

In US Publication No. 2004-0112525, the content of which is incorporated herein by reference, a method for improving the adhesion properties and switching performance of electrophoretic displays is disclosed. The method involves utilizing a composition comprising a high dielectric polymer or oligomer and optionally a crosslinking agent as an adhesive or top-sealing layer. In the method disclosed, a thermal hardening step is typically required. Unfortunately, thermal hardening is a very slow process particularly at a low temperature typically employed to avoid undesirable evaporation of the dielectric solvent in the electrophoretic fluid. A catalyst for the crosslinking reaction may be used to speed up thermal curing, however, at the expense of the green time of the coating solution. The low thermal curing temperature also results in a low Tg of the cured top-sealing or adhesive layer because of the vitrification effect—the thermal curing reaction will slow down significantly when Tg of the curing system is approaching the curing temperature. A low Tg top-sealing or adhesive layer therefore results in deteriorated EPD temperature latitude probably because the pigment particles tend to irreversibly stick to the top-sealing layer when the operation temperature is approaching the Tg of the top-sealing material.

The other disadvantage of the thermally cured top-sealing/adhesive layer is the short green time for the subsequent lamination onto the electrode layer or supporting substrate. As a result, the display panels manufactured with the thermally cured sealing or adhesive layer are often finished display panels with the electrode layer (12) laminated before being shipped to customers. This finished or prelaminated structure requires different electrode patterns or designs predetermined at the time of panel manufacturing to meet different customer specifications. For electrophoretic or liquid crystal displays that require a common, non-patterned electrode layer or an insulating substrate on one side, it is highly desirable to streamline the manufacturing operation by supplying to customers a semi-finished display panel in a jumbo roll which comprises filled and sealed microcups laminated with a temporary substrate such as a release liner to prevent the sealing or adhesive layer from sticking to the back of the roll. Upon receiving the roll of the semi-finished display panel, customers may cut it into the desired format and size, remove the temporary substrate to expose the sealing or adhesive layer, and laminate the panel onto a second electrode layer with a desired electrode design to complete the display panel assembling for various applications. Alternatively, the second substrate or electrode layer may be disposed onto the sealed microcups by a method such as coating, printing, vapor deposition, sputtering or a combination thereof to meet the customers' specific needs. A protective overcoat may be applied onto the sealed microcups or the second electrode layer to further improve the optical or physicomechanical properties of the finished panel. The finished display panel is then ready for module assembly.

This new product concept significantly simplifies the manufacturing process and reduces cost. To enable this product concept, an adhesive or sealing layer having a long green time before lamination and high post curing rate after lamination onto an electrode layer or substrate is highly desirable.

SUMMARY OF THE INVENTION

The first aspect of the invention is directed to a top-sealing or adhesive composition comprising a high dielectric polymer or oligomer and a radiation curable composition. The top-sealing or adhesive composition may be used in the partition types including the microcup type of electrophoretic or liquid crystal display or device in which the display fluid is filled and top-sealed in the display cells constructed on a first substrate or electrode layer. This display sealing process may be called the "top sealing process". The display cells are top-sealed before a second substrate or electrode layer is disposed thereon.

The second aspect of the invention is directed to an electrophoretic or liquid crystal display or device having an adhesive or top sealing layer which is formed from a composition comprising a high dielectric polymer or oligomer and a radiation curable composition.

The third aspect of the invention is directed to a variety of "semi-finished panel"s having a sandwich-like structure. The semi-finished panel comprises an array of filled and top-sealed display cells which is sandwiched between a first electrode or substrate layer and a temporary substrate such as a release liner.

In one embodiment of this aspect of the invention, the array of filled and top-sealed display cells may be formed on the first electrode or substrate layer and the temporary substrate is laminated over the filled and sealed display cells with an adhesive layer of the present invention.

In a second embodiment, the array of filled and top-sealed display cells may be formed on a temporary substrate and the first electrode or substrate layer is laminated over the filled and top-sealed display cells, with an adhesive layer of the present invention.

In a third embodiment, the array of filled and top-sealed display cells may be formed on the temporary substrate and the first electrode or substrate layer is disposed onto the filled and sealed display cells by a method such as coating, printing, vapor deposition, sputtering or a combination thereof. In this embodiment, the display cells are also sealed with a top-sealing composition of the present invention.

In a fourth embodiment, the array of filled and top-sealed display cells may be formed on the temporary substrate. An adhesive layer of the present invention is coated onto the top-sealed display cells and the first electrode or substrate layer is disposed onto the filled and top-sealed display cells by a method such as coating, printing, vapor deposition, sputtering or a combination thereof.

In a fifth embodiment, the array of filled and top-sealed display cells may be formed on the first electrode or substrate layer and the temporary substrate is laminated over the filled and sealed display cells, without an additional adhesive layer. In this embodiment, the display cells are sealed with a top-sealing composition of the present invention.

In a sixth embodiment, the array of filled and top-sealed display cells may be formed on the temporary substrate and the first electrode or substrate layer is laminated over the filled and top-sealed display cells, without an additional adhesive layer. In this embodiment, the display cells are also sealed with a top-sealing composition of the present invention.

The fourth aspect of the invention is directed to a semi-finished panel comprises an array of filled and top-sealed display cells which is sandwiched between two temporary substrates. The filled and top-sealed cells are formed on the first temporary substrate. In one embodiment, the filled cells are sealed with a top-sealing composition of the present invention and laminated onto the second temporary substrate. In a second embodiment, an adhesive composition of the present invention is used to laminate the second temporary substrate onto the filled and top-sealed display cells. To convert the semi-finished display panel to a finish panel, the two temporary substrates are removed and two permanent substrate layers, at least one of which comprises an electrode layer, are laminated onto each side of the panel of filled and top-sealed display cells. Alternatively, the permanent substrate or electrode layer(s) may be disposed onto the filled and top-sealed cells by a method such as printing, coating, vapor deposition, sputtering or a combination thereof.

The fifth aspect of the invention is directed to processes for the manufacture of semi-finished display panels and for conversion of semi-finished display panels to finished display panels.

The sixth aspect of the invention is directed to a process for improving the adhesion and physicomechanical properties of an electrophoretic or liquid crystal display or device, particularly when the second substrate or electrode layer is opaque to radiation or UV. The process comprises (1) activating by heat or radiation a catalyst or photoinitiator in the adhesive or top-sealing/adhesive layer of a semi-finished panel before or after the temporary substrate is removed; (2) laminating the activated semi-finished panel structure without the temporary substrate onto a second substrate or electrode layer, and optionally (3) post curing the finished display panel by heat or radiation. If radiation is used to post cure the top-sealing/adhesive or adhesive layer, the exposure may be accomplished through either side of the panel optionally with the electric field turned on to reduce the optical hiding effect of the electrophoretic fluid.

The seventh aspect of the invention is directed to a method for improving the physicomechanical and electro-optical properties of an electrophoretic or liquid crystal device or display which method comprises forming on top of the display fluid a sealing layer which comprises a high dielectric polymer or oligomer and a radiation curable composition.

The eighth aspect of the invention is directed to a method for improving the physicomechanical and electro-optical properties of an electrophoretic or liquid crystal device or display which method comprises adhering one element (e.g., an array of filled and sealed display cells) of the display to another element (e.g., an electrode or substrate layer) with an adhesive composition which comprises a high dielectric polymer or oligomer and a radiation curable composition.

The ninth aspect of the present invention is directed to the use of a high dielectric polymer or oligomer and a radiation curable composition as a top-sealing or adhesive layer to improve the physicomechanical and electro-optical properties of an electrophoretic or liquid crystal device or display.

The electrophoretic display may comprise display cells which are filled with an electrophoretic fluid comprising charged pigment particles dispersed in a dielectric solvent, particularly a fluorinated dielectric solvent.

DEFINITIONS

Unless defined otherwise in this specification, all technical terms are used herein according to their conventional definitions as they are commonly used and understood by those of ordinary skill in the art. Trade names are identified for materials used and their sources are also given.

The term "Dmax" refers to the maximum optical density achievable by a display.

The term "Dmin" refers to the minimum optical density achievable by a display.

The term "contrast ratio" is defined as the ratio of the % reflectance of an electrophoretic display at the Dmin state to the % reflectance of the display at the Dmax state.

The term "display cell" is intended to encompass not only display cells which are filled with an electrophoretic fluid but also display cells which are filled with a liquid crystal composition. In addition, the "display cells", in the context of the present invention, preferably are the display cells prepared from microcups according to any of the processes as described in U.S. Pat. No. 6,930,818. While the plural form (i.e., display cells) is used, the term is not intended to limit the scope of protection. It is understood that a display may have multiple display cells or one single display cell (e.g., a liquid crystal display).

The term "top-sealing" is intended to refer to a sealing process in which the display cells constructed on a first substrate or electrode layer are filled and top-sealed. In the conventional edge seal process, two substrates or electrode layers and an edge seal adhesive are required to enclose and edge-seal the display fluid in the cell(s). In contrast, in the top-sealing process, the display fluid is enclosed and top-sealed before a second substrate or electrode layer is disposed onto the display cell(s).

The term "display panel" is intended to refer to an array of filled and sealed display cells which may be sandwiched between, for example, two electrode layers, one electrode layer and one substrate layer, one temporary substrate and one electrode layer, one temporary substrate and one permanent substrate layer or two temporary substrate layers.

The term "semi-finished display panel" is intended to refer to an array of filled and top-sealed display cells which are sandwiched between one temporary substrate layer and one electrode layer, one temporary substrate layer and one substrate layer or two temporary substrate layers. The temporary substrate layer is removed before a second electrode layer or substrate layer is laminated over the filled and sealed display cells.

Figure 1:
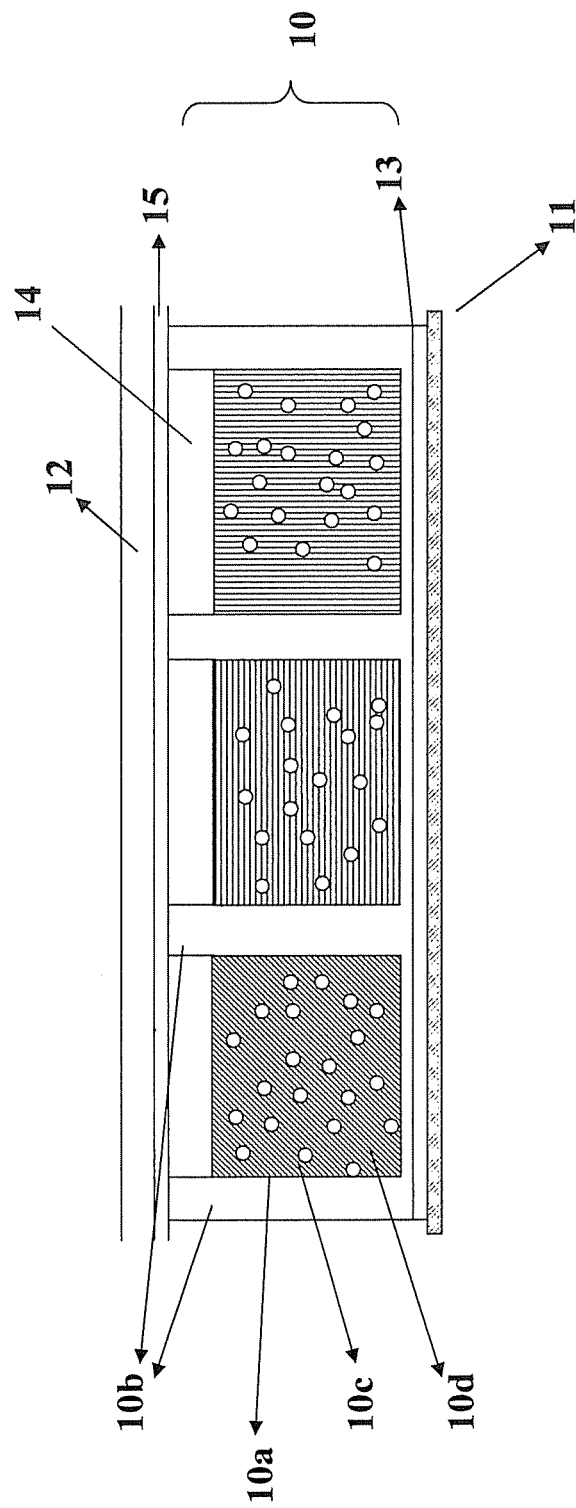
FIG. 1 depicts a display cell prepared by the microcup technology.

The term "finished panel" is intended to refer to an array of filled and top-sealed display cells which are sandwiched between, for example, two electrode layers (e.g., one shown in FIG. 1) or one electrode layer and one substrate layer (e.g., a display with an in plane switching mode).

DETAILED DESCRIPTION OF THE INVENTION

The first aspect of the invention is directed to a composition comprising a high dielectric polymer or oligomer and a radiation curable composition. The sealing or adhesive composition may be used in the partition types including the microcup type of electrophoretic or liquid crystal display or device in which the display fluid is filled and top-sealed in the display cells constructed on a first substrate or electrode layer. The display cells are top-sealed before a second substrate or electrode layer is disposed thereon.

When it is used as a top-sealing composition, a temporary substrate or an electrode or permanent substrate layer may be directly laminated over the filled and top-sealed display cells without an adhesive layer. In other words, the top-sealing layer in this case also serves as an adhesive layer. For clarity, this type of top-sealing layer may be referred to as a "top-sealing/adhesive" layer in the present application. The elimination of a separate adhesive layer improves the switching performance of the display as the thickness of the layer underneath the electrode layer is reduced.

Alternatively, a separate adhesive layer of the present invention may be coated over a sealing layer. In this case, the sealing layer may or may not be formed from the composition of the present invention. For example, it may be formed from a composition as described in U.S. Pat. Nos. 6,930,818 and 7,005,468, the contents of which are incorporated herein by reference in their entirety.

If it is used as an adhesive layer, the composition may be coated either on the panel of filled and top-sealed display cells or on a layer to be laminated over the panel (e.g., a temporary substrate, an electrode layer or a permanent substrate layer) before lamination. In this case, the top-sealing layer may have a composition which is the same as that of the adhesive layer or different from that of the adhesive layer. In the latter case, the composition of the top-sealing layer may be one of those disclosed in U.S. Pat. Nos. 6,930,818 and 7,005,468, the whole contents of which are incorporated herein by reference.

The high dielectric polymers and oligomers the present invention refers to polymers and oligomers having a dielectric constant higher than that of the dielectric solvent used in the display fluid (e.g. electrophoretic fluid and liquid crystal composition). However, polymers having a very high dielectric constant tend to be hydrophilic and may result in a poor environmental stability, particularly under high humidity conditions. For optimum performance, the dielectric constant of the polymers or oligomers for this invention is preferably in the range of 2.5-17, more preferably 3-15, measured at 18-27° C. and at less than or equal to 60 Hz. Among them, the colorless and transparent polymers are the most preferred.

Examples may include, but are not limited to, polyurethanes, polyureas, polycarbonates, polyamides, polyesters, polycaprolactones, polyvinyl alcohol, polyethers, polyvinyl acetate derivatives such as poly(ethylene-co-vinylacetate], polyvinyl fluoride, polyvinylidene fluoride, polyvinyl butyral, polyvinylpyrrolidone, poly(2-ethyl-2-oxazoline), acrylic or methacrylic copolymers, maleic anhydride copolymers, vinyl ether copolymers, styrene copolymers, diene copolymers, siloxane copolymers, cellulose derivatives, gum Arabic, alginate, lecithin, polymers derived from amino acids, and the like. Suitable cellulose derivatives may include, but are not limited to, hydroxyethyl cellulose, propyl cellulose, cellulose acetate propionate, cellulose acetate butyrate or the like and the graft copolymers thereof. The composition of the present invention may comprise one or more high dielectric polymers or oligomers.

The polymers and oligomers may have functional group(s) for chain extension or crosslinking during or after lamination.

Among the polymers and oligomers mentioned above, polyurethanes, polyureas, polycarbonates, polyesters and polyamides, especially those comprising a functional group, are particularly preferred because of their superior adhesion and optical properties and high environmental resistance. Examples for the functional groups may include, but are not limited to, —OH, —SH, —NCO, —NCS, —NHR, —NRCONHR, —NRCSNHR, vinyl or epoxide and derivatives thereof, including cyclic derivatives. The "R" in the functional groups mentioned above may be hydrogen or alkyl, aryl, alkylaryl or arylalkyl of up to 20 carbon atoms which alkyl, aryl, alkylaryl or arylalkyl may be optionally substituted or interrupted by N, S, O or a halogen. The "R" preferably is hydrogen, methyl, ethyl, phenyl, hydroxymethyl, hydroxyethyl, hydroxybutyl or the like.

Functionalized polyurethanes, such as hydroxyl terminated polyester polyurethanes or polyether polyurethanes, isocyanate terminated polyester polyurethanes or polyether polyurethanes or acrylate terminated polyester polyurethanes or polyether polyurethanes are particularly preferred.

The polyester polyols or polyether polyols used for the synthesis of polyester polyurethanes or polyether polyurethanes may include, but are not limited to, polycaprolactone, polyesters (derived from, for examples, adipic acid, phthalate anhydride or maleic anhydride), polyethylene glycol and its copolymers, polypropylene glycol and its copolymers, and the like. Among the polyester polyurethanes, the hydroxyl or isocyanate terminated polyester polyurethanes, such as those from the IROSTIC series (by Huntsman Polyurethanes) are some of the most preferred. Tables of dielectric constants of typical commercially available polymers can be found in literature such as "Electrical Properties of Polymers", by C. C. Ku and R. Liepins; Hanser Publishers, 1993; and "Prediction of Polymer Properties" $3^{rd}$. ed., by J. Bicerano; Marcel Dekker, Inc., 2002. Some of them are listed in Table 1 below:

TABLE 1

Dielectric Constants of Polymers (from "Electrical Properties of Polymers", by C. C. Ku and R. Liepins, Hanser Publishers, 1993)

| Polymers | $\epsilon$ | Temperature (° C.) | Frequency (Hz) |
|---|---|---|---|
| Polyvinyl alcohol/acetate), 0-1.5% acetate (Elvannol 50A-42) | 10.4 | 25 | $10^3$ |
| Polyether polyurethane (based on polyethylene oxide 600) | 10 | 18 | 10 |
| Polyurethane Elastomers | 4.7-9.53 | 25 | 60 |
| Polyfumaronitrile | 8.5 | 26 | $10^3$ |
| Poly (vinyl fluoride) | 8.5 | 25 | $10^3$ |
| Poly (vinylidene fluoride) | 8.4 | 25 | $10^3$ |
| Melamine/formaldehyde resin | 7.9 | 25 | 60 |

TABLE 1-continued

Dielectric Constants of Polymers (from "Electrical Properties of Polymers", by C. C. Ku and R. Liepins, Hanser Publishers, 1993)

| Polymers | $\epsilon$ | Temperature (° C.) | Frequency (Hz) |
|---|---|---|---|
| Cellulose nitrate | 7.0-7.5 | 25 | 60 |
| Polysulfide | 7.3 | 25 | 60 |
| Phenol/aniline/formaldehyde (Bakelite BT-48-306) | 7.15 | 24 | $10^3$ |
| Chlorosulfonated polyethylene | 7.0 | 25 | 60 |
| Melamine/phenol resin | 7.0 | 25 | 60 |
| Methyl cellulose (Methocel) | 6.8 | 22 | $10^3$ |
| Poly (urea/formaldehyde) | 6.7 | 24 | $10^3$ |
| Cellulose acetate butyrate | 3.2-6.2 | 25 | $10^3$ |
| Cellulose acetate propionate | 3.2-6.2 | 25 | $10^6$ |
| Phenol/aniline/formaldehyde (Durite No. 221X) | 5.70 | 24 | 60 |
| Phenol/aniline/formaldehyde | 4.50 | 25 | $10^3$ |
| Cellulose triacetate | 3.2-4.5 | 25 | $10^3$ |
| Epoxy, standard (Bisphenol A) | 4.02 | 25 | 60 |
| Poly(methyl methacrylate)/polyvinyl chloride)alloy | 4.0 | 25 | 60 |
| Nylon 66 | 4.0 | 25 | 60 |
| Nylon 6/12 | 4.0 | 25 | 60 |
| Allyl diglycol carbonate | 2.0-3.9 | 25 | $10^4$ |
| Acetal(polyoxymethylene), Delrin | 3.7 | 25 | 60 |
| Nylon 6 | 3.7 | 25 | |
| Aniline-formaldehyde (Dilectene 100) | 3.68 | 25 | $10^3$ |
| Aromatic polyester-imides | 3.50 | 25 | $10^3$ |
| Aromatic polyimides | 3.5 | 25 | $10^3$ |
| Acrylonitril-Butadiene-Styrene(ABS) | 2.5-3.5 | 25 | 60 |
| Aromatic polyamideimides | 3.32 | 25 | $10^3$ |
| Poly (butadiene) | 3.3 | 25 | $10^6$ |
| Cellulose, regenerated (cellophane) | 3.2 | 25 | $10^3$ |
| Cellulose propionate | 3.2 | 25 | $10^6$ |
| Cycloaliphatic epoxy resin | 3.2 | 25 | 60 |
| Poly(ethylene terephthalate), thermoplastic | 3.2 | 25 | $10^3$ |
| Poly(butyl terephthalate) | 3.2 | 25 | 100 |
| Ethylene/vinyl acetate copolymer | 3.16 | 25 | 60 |
| Aromatic polyethers | 3.14 | 25 | 60 |
| Aromatic polysulfone | 3.13 | 23 | $10^3$ |
| Poly (methyl methacrylate), Plexiglas | 3.12 | 27 | $10^3$ |
| Ethyl cellulose, Ethocel LT-5 | 3.09 | 25 | $10^3$ |
| Poly (vinyl chloride), chlorinated | 3.08 | 25 | 60 |
| Poly (vinyl acetate) Elvacet 42A-900) | 3.07 | 25 | $10^3$ |
| Polysiloxane resin (methyl, phenyl, and methylphenyl) | 3.04 | 25 | $10^3$ |
| Poly(styrene/acrylonitrile) (SAN) | 2.6-3.0 | 25 | $10^4$ |
| Polycarbonate | 2.99 | 25 | $10^3$ |
| Methyl and methylphenyl polysiloxane (DC 550) | 2.90 | 20 | $10^3$ |
| Poly(ethyl methacrylate) | 2.75 | 22 | $10^3$ |
| Poly (methyl methacrylate) | 2.68 | 25 | $10^3$ |
| Poly(butyl methacrylate) | 2.62 | 24 | 100 |
| Poly(2,6-dimethyl-1,4-phenylene ether) | 2.6 | 25 | $10^3$ |
| Fluorinated ethylene/propylene copolymer (FEP) | 2.0-2.5 | 25 | $10^3$ |
| SBR (75% butadiene) | 2.5 | 26 | $10^3$ |
| Polystyrene | 2.4 | 25 | $10^3$ |
| Poly(98-99% isobutylene/1-2% isoprene) (GR-I; butyl rubber) | 2.38 | 25 | $10^3$ |
| Polyethylene, ultra high MW | 2.3 | 25 | $10^3$ |
| Polyethylene, medium density | 2.2 | 25 | $10^3$ |
| Polytetrafluoroethylene | 2.0 | 25 | $10^3$ |

The radiation curable composition comprises a radiation curable monomer or oligomer. Examples of monomers and oligomers suitable for the present invention may include, but are not limited to, urethane acrylates, epoxy acrylates, polyester acrylates, acrylic acrylates, glycidyl acrylates, cycloaliphatic epoxides, acetylenes or vinyls such as vinyl benzenes, vinyl acrylates or vinyl ethers, ally esters, polymers and oligomers comprising a functional group mentioned above, and the like. The radiation curable composition is preferably compatible with the high dielectric polymer or oligomer which preferably comprises a functional group that may be chemically bonded or grafted onto the radiation curable resin matrix.

Commercially available radiation curable monomers or oligomers include, but are not limited to, UV curable urethane acrylate oligomers (e.g., CN983 from Sartomer), UV curable polyester acrylate oligomer (e.g., Eb810 from UCB Chemical Corporation), UV curable silicon acrylate oligomer (e.g., Eb1360 from UCB Chemical Corporation) and Silica Organosol, OG601-3 (Claritant Corporation).

In one embodiment, the multifunctional monomer or oligomer may comprise a pendant or end-capped acrylate, methacryalate, epoxy or vinyl group.

In another embodiment, the multifunctional monomer or oligomer may be a low molecular weight polyurethane, polyepoxide, polyester, polyacrylate, polymethacrylate, polycarbonate, polystyrene or polyether.

In a further embodiment, the multifunctional monomer or oligomer may have a molecular weight ranging from 300 to 20,000.

In yet another embodiment, the multifunctional monomer or oligomer may be an aliphatic or aromatic urethane acrylate.

The radiation curable composition preferably is a good plasticizer or diluent for the high dielectric polymer or oligomer.

The total concentration of the high dielectric polymer or oligomer in the sealing or adhesive layer is preferably in the range of 3 to 95%, more preferably in the range of 30 to 75%, by dry weight of the layer. The total concentration of the radiation curable monomer or oligomer is preferably in the range of 1 to 50%, more preferably in the range of 5 to 30%, by dry weight of the layer.

The sealing or adhesive composition may be dissolved or dispersed in a common solvent, in particular an organic solvent, such as methyl ethyl ketone (MEK), methyl isobutyl ketone (MIBK), cyclohexanone, acetone, butyl acetate, isopropyl acetate, ethyl acetate, tetrahydrofuran (THF), 1,2-diethoxy ethane or a mixture thereof. The solution typically is thoroughly mixed and degassed immediately before coating.

The composition of the invention may further comprise a crosslinking agent. Suitable crosslinking agents for hydroxy-containing or amino-containing high dielectric polymers may include, but are not limited to, multifunctional isocyanates or isothiocyanates, multifunctional epoxides or polyaziridines, among which aliphatic polyisocyanates (e.g., Desmodur N-100 from Bayer and Irodur E-358 from Huntsman Polyurethane) and polyaziridines are the most preferred.

Suitable crosslinking agents for multifunctional epoxy-containing or isocyanate-containing high dielectric polymers may include, but are not limited to, multifunctional alcohols and amines such as butanediol, pentanediol, glycerol, triethanolamine, trimethylolpropane, N,N,N',N'-tetrakis(2-hydroxyethyl)ethylene diamine, ethylene diamine, diethylene triamine, Jeffermine, polyimine and derivatives thereof.

When a hydroxyl terminated polyester polyurethane is used as the high dielectric polymer and a polyisocyanate is used as the crosslinking agent in the composition, the molar ratio of the hydroxyl group of the hydroxyl terminated polyester polyurethane to the isocyanate group of the polyisocyanate is preferably 1/10 to 10/1, more preferably 1.1/1 to 2/1.

While a crosslinking agent is present, a catalyst may also be added to promote the crosslinking reaction. Suitable catalysts may include, but are not limited to, organotin catalysts (e.g., dibutyl tin dilaurate, DBTDL), organozirconium catalysts (e.g., zirconium chelate 2,4-pentanedione, K-Kat XC-4205 and K-Kat XC-6212 from King Industry), bismuth catalysts (e.g., K-Kat348 also from King Industry), with organotin and organozirconium catalysts being the most preferred.

The concentration of the crosslinking agent is preferably in the range of 1 to 20% by weight, more preferably in the range of 2 to 10% by weight, based upon the total dry weight of the polymer or oligomer. The concentration of the catalyst is preferably in the range of 0.1 to 5% by weight, more preferably in the range of 0.2 to 3% by weight, based upon the total dry weight of the resin.

In another embodiment, part of the high dielectric polymer or oligomer in the composition may be replaced with a radically or photochemically graftable polymer. Suitable graftable polymers may include, but are not limited to, cellulose derivatives such as cellulose acetate butyrate (CAB), cellulose acetate propionate (CAP), hydroxypropyl cellulose (HPC), hydroxybutyl cellulose (HBC), hydroxyethyl cellulose (HEC), methyl cellulose (MC), carboxymethyl cellulose (CMC) or copolymers thereof and polyvinyl alcohol derivatives such as polyvinyl acetal, polyvinyl butyral or copolymers thereof. Polymers of a high glass transition temperature (Tg) and high modules at the application conditions (temperature, pressure, shear rate etc.) are preferred. Particularly preferred polymers include cellulose acetate, cellulose acetate butyrate, cellulose acetate propionate, polyvinyl acetal and copolymers thereof.

The radically or photochemically graftable polymer or copolymer may be about 5% to about 30% by weight, preferably about 10% to about 20% by weight, of the high dielectric polymer or oligomer.

In this case, the composition may comprise a photoinitiator. Suitable photoinitiators may include, but are not limited to, benzophenone, ITX (isopropyl thioxanthone), BMS (4(p-tolylthio)benzophenone) and others, for example, Irgacure 651, 907, 369 or 184 (from Ciba Specialty Chemicals). The photoinitiator, if present, is usually in the amount of about 0.5% to about 5%, preferably about 1% to about 3% by weight, based on the total weight of the high dielectric polymer or oligomer, radiation curable composition and the graftable polymer.

The graftable polymer containing composition is formed by dissolving the high dielectric polymer or oligomer, the graftable polymer and a photoinitiator, if present, in a solvent system as described above.

If the composition is used as an adhesive, it may be coated onto a temporary substrate, a second electrode layer or a substrate layer. The coated temporary substrate, electrode layer or substrate may then be laminated over the filled and top-sealed display cells and the resultant semi-finished or finished panel may be post cured as described below. In this case, the display cells may be pre-sealed with a sealing layer as described in U.S. Pat. Nos. 6,930,818, 6,795,138, 6,672,921, 6,933,098, 6,545,797 and 7,005,468, and US Publication Nos. 2004-0085619, and 2004-0170776 (now U.S. Pat. No. 7,141,279); all of which are incorporated herein by reference.

The composition of this invention may also be used as a top-sealing composition and the display cells may be filled and top-sealed according to the one-pass or two-pass process as disclosed in the above-mentioned applications. The composition, when used as a sealing composition, preferably is incompatible with the display fluid (e.g., electrophoretic fluid or liquid crystal composition). The sealing composition may also have a specific gravity which is not greater than that of the display fluid.

In the case that the top-sealing layer of the present invention is thick or tacky enough to also serve as an adhesive layer, the top-sealed and filled display cells may be laminated directly onto a temporary substrate, a second electrode layer or a substrate. Alternatively, a substrate or electrode layer may be disposed onto the top-sealed microcups by a method such as coating, printing, vapor deposition, sputtering or a combination thereof to meet the customers' specific.

The top-sealing layer of the present invention may have a thickness of less than 10 microns, preferably about 1 to about 8 microns, more preferably about 3 to about 6 microns, measured at its center area. The center area ("CA") of a top sealing layer has the size of only about 10%, preferably about 5%, of the total surface area ("TA") of a top-sealing layer in each display cell, discounting the wall area ("WA"). It should be noted that in FIGS. 3 and 4, the center areas are exaggerated for clarity. The center area has the same shape as the top-sealing layer.

As also shown in FIG. 3, the shape of the top-sealing layer may be regular or irregular.

Figure 3B:
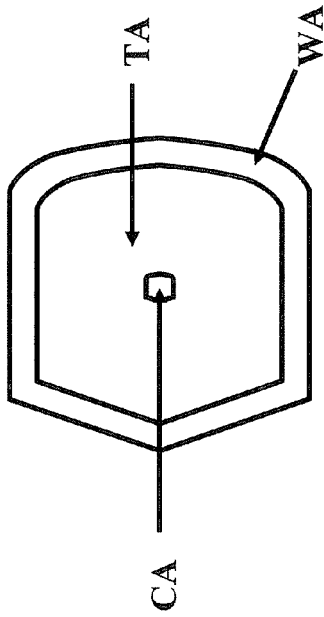
FIGS. 3a-3d illustrate center areas of a top-sealing layer.
Figure 3D:
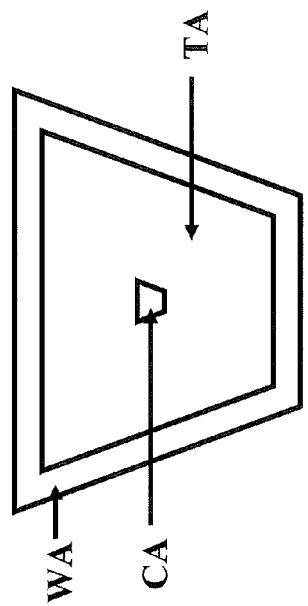
Figure 3A:
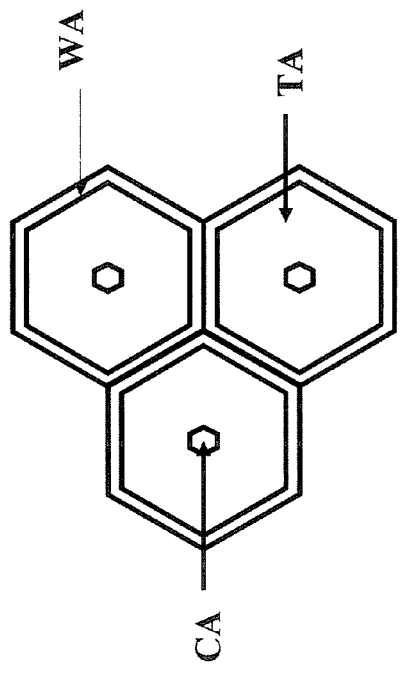

FIGS. 3a and 3b show that the top-sealing layers have a regular shape (square and hexagon respectively) and the center area is an area surrounding the center point (CP) of the top-sealing layer.

Figure 3C:
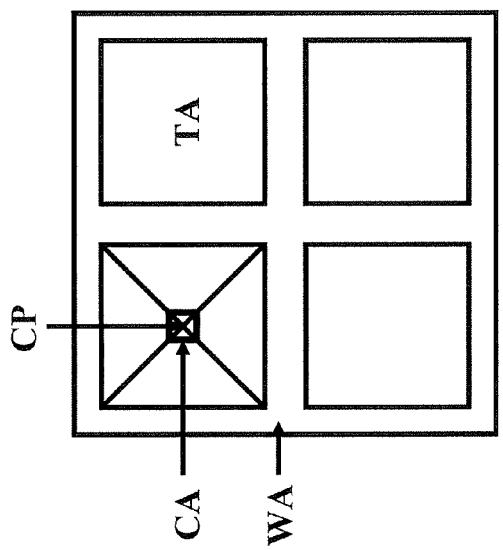

FIGS. 3c and 3d demonstrate that the top-sealing layers are of irregular shapes. In this case, the center area (CA) located in the center of the top-sealing layer has a size proportionally reduced to about 10%, preferably about 5%, of the total area (TA) of the top-sealing layer. The center areas therefore have the same shape as the top-sealing layers.

The area on a top-sealing layer outside of the center area is referred to as a non-center area (non-CA). FIGS. 4a-4d are the cross-section view of top-sealing layers.

Figure 4A:
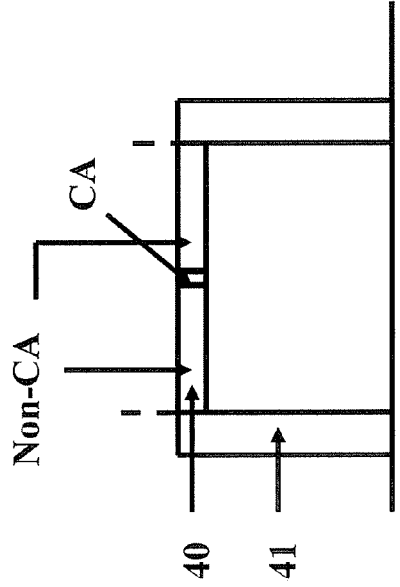
FIGS. 4a-4d are cross-section view of the top-sealing layer.
Figure 4B:
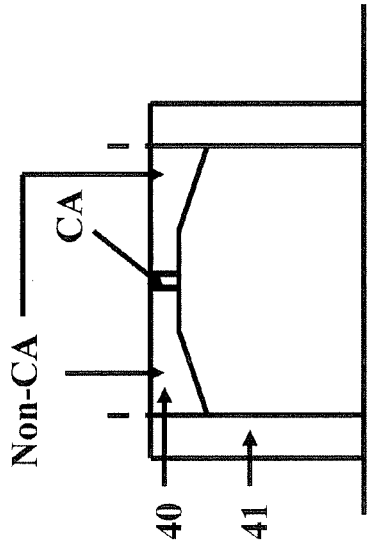
Figure 4C:
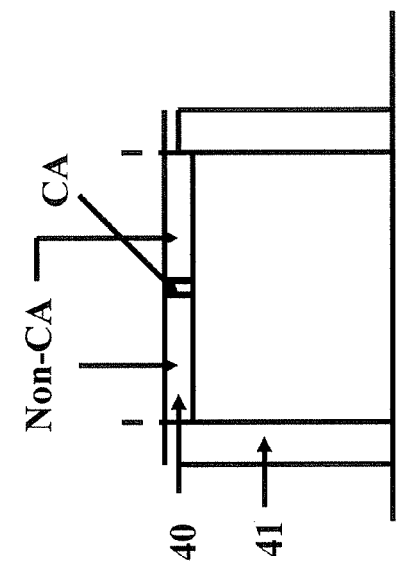
Figure 4D:
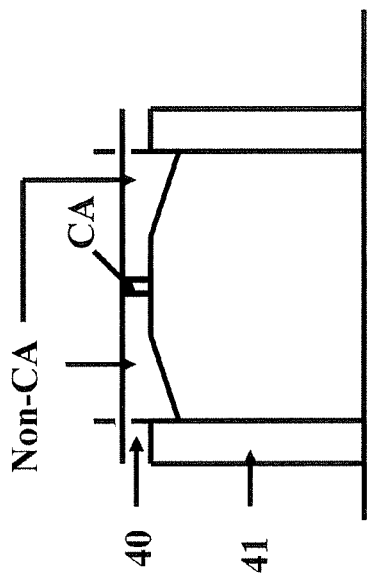

In FIGS. 4a and 4c, the top-sealing layer (40) extends over the top of the partition walls (41). In FIGS. 4b and 4d, the top-sealing layer (40) does not extend over the top of the partition walls (41).

FIGS. 4a and 4b also show that the thickness of the top-sealing layer is substantially uniform. In other words, the non-center areas (Non-CA), like the center area, also have a thickness of less than about 10 microns, preferably about 1 to about 8 microns, more preferably about 3 to about 6 microns.

FIGS. 4c and 4d, on the other hand, show that the thickness of the top-sealing layer is not uniform. In other words, at least one portion of the non-center area may exceed 10 microns while the center area remains at less than 10 microns in thickness.

The adhesive layer of the present invention may also have a thickness of less than about 10 microns, preferably about 1 to about 8 microns, more preferably about 1 to about 6 microns and most preferably about 3 to about 6 microns.

These features are critical to a display device in which the dielectric layer(s) (e.g., the adhesive and/or sealing layers) and the display fluid are in the path of an electric field which drives the display device (e.g., the dielectric layer(s) and the display fluid are sandwiched between electrode layers). It is found that the combination of the dielectric layer(s) formed from a material having a high dielectric constant and the low thickness of the dielectric layer(s) allows full function of a display device at low voltages (e.g., below 20V).

By incorporating a radiation curable composition into the adhesive/top-sealing or adhesive layer, the physicomechanical properties of the display panel (e.g., a semi-finished or finished display panel) may be built up rapidly during its manufacture by radiation curing to form an interpenetrating network (IPN) or a semi-interpenetrating network (Semi-IPN). The panel may be wound up in a roll immediately after sealing. For a semi-finished panel structure, upon removing the temporary substrate, the display panel may be further exposed to radiation before, during or after lamination of a second substrate or electrode layer. A very wide process window is therefore achieved without trading off the physicomechanical properties of the finished display panel.

The use of a radiation curable resin in the top-sealing layer provides a crosslinking network via the rapid radiation curing mechanism, which is more efficient and environmentally acceptable than the thermal curing mechanism. Furthermore, the combined use of a thermally curable high dielectric polymer or oligomer and a radiation curable composition allows a dual cure (thermal and radiation) mechanism to further improve the physicomechanical properties of the finished display panel and process latitude of its manufacture.

The composition of the present invention may further comprise additives such as an organic solvent, plasticizer, thickener, filler, colorant, antioxidant, photoinitiator, catalyst, surfactant or the like.

The radiation curable composition may further comprise, in addition to the monomer or oligomer, a binder, plasticizer, photoinitiator, coinitiator, oxygen scavenger, thermal stabilizer, filler, surfactant or the like.

In one embodiment of the invention, the radiation curable composition may be a cationic type of UV curable composition. Its advantage over the radical type of UV curable system is insensitivity to oxygen and the long green time between the UV exposure and the lamination step. Latent catalyst(s) may be generated during the UV exposure step and activated during or after the subsequent lamination step.

Another aspect of the invention is directed to an electrophoretic or liquid crystal display or device having an adhesive or top-sealing layer formed from a composition which comprises a high dielectric polymer or oligomer and a radiation curable composition as described above. The layer may also comprise one or more additives as described above.

To streamline the display or device manufacturing process, a variety of semi-finished panels having a sandwich-like structure are useful. The semi-finished display panels comprise an array of filled and top-sealed display cells which is sandwiched between a first electrode or substrate layer and a temporary substrate or between two temporary substrates. The temporary substrate such as a release liner may be formed from a material selected from the group consisting of polyethylene terephthalate (PET), polycarbonate, polyethylene (PE), polypropylene (PP), paper and a laminated or cladding film thereof. A silicone release coating may be applied onto the temporary substrate to improve the release properties.

In one embodiment of this aspect of the invention, the array of filled and top-sealed display cells may be formed on the first electrode or substrate layer and the temporary substrate is laminated over the filled and top-sealed display cells with an adhesive layer of the present invention.

In a second embodiment, the array of filled and top-sealed display cells may be formed on a temporary substrate and the first electrode or substrate layer is laminated over the filled and top-sealed display cells, with an adhesive layer of the present invention.

In a third embodiment, the array of filled and top-sealed display cells may be formed on the temporary substrate and the first electrode or substrate layer is disposed onto the filled and top-sealed display cells by a method such as coating, printing, vapor deposition, sputtering or a combination thereof. In this embodiment, the display cells are also top-sealed with a top-sealing composition of the present invention.

In a fourth embodiment, the array of filled and top-sealed display cells may be formed on the temporary substrate. An adhesive layer of the present invention is coated onto the top-sealed display cells and the first electrode or substrate layer is disposed onto the filled and top-sealed display cells by a method such as lamination, coating, printing, vapor deposition, sputtering or a combination thereof.

In a fifth embodiment, the array of filled and top-sealed display cells may be formed on the first electrode or substrate layer and the temporary substrate is laminated over the filled and top-sealed display cells, without an additional adhesive layer. In this embodiment, the display cells are top-sealed with a top-sealing composition of the present invention.

In a sixth embodiment, the array of filled and top-sealed display cells may be formed on the temporary substrate and the first electrode or substrate layer is laminated over the filled and top-sealed display cells, without an additional adhesive layer. In this embodiment, the display cells are also top-sealed with a top-sealing composition of the present invention. In the third, fifth and sixth embodiments, an adhesive layer of the present invention may be optionally coated on the filled and top-sealed display cells.

The semi-finished display panels may be prepared by process as described below. In one embodiment, the process comprises (1) preparing an array of filled and top-sealed display cells on an electrode or substrate layer, (2) laminating a temporary substrate or a release layer with adhesive layer of the present invention onto the filled and top-sealed display cells, and (3) optionally curing or hardening the adhesive layer. The adhesive layer may be coated on the filled and top-sealed display cells or on the temporary substrate. When converting this semi-finished display panel to a finished display panel, a second electrode or substrate layer may be disposed onto the filled and sealed display cells after the temporary substrate is peeled off without removing the adhesive layer. The second electrode or substrate layer may be disposed onto the filled and sealed display cells by a method such as lamination, coating, printing, vapor deposition, sputtering or a combination thereof.

Another process comprises (1) preparing an array of filled and top-sealed display cells on a temporary substrate, preferably a transparent substrate, (2) laminating a first electrode or substrate layer with an adhesive layer of the present invention onto the filled and sealed display cells, and optionally (3) curing or hardening the adhesive layer. Optionally the adhesive may be coated on the electrode or substrate layer or on the filled and top-sealed display cells before lamination. When converting this semi-finished display panel to a finished display panel, a second electrode or substrate layer precoated with an adhesive layer of the present invention is laminated or disposed over the filled and sealed display cells (on the side opposite from the sealing layer) after the temporary substrate layer is peeled off. Alternatively, the last lamination or disposition step may be accomplished with an adhesive of the present invention coated onto the filled cells on the opposite side from the sealing layer.

A further process comprises (1) preparing an array of display cells on an electrode or substrate layer, (2) filling the display cells, (3) top-sealing the filled display cells with a top-sealing layer of the present invention, (4) laminating a temporary substrate onto the filled and sealed display cells without a separate adhesive layer, and optionally (5) curing or hardening the top-sealing/adhesive layer. In this case, the top-sealing layer may also serve as an adhesive layer. Alternatively, an adhesive layer of the present invention may be coated on the filled and top-sealed display cells or on the temporary substrate before lamination. When converting such a semi-finished display panel to a finished display panel, a second electrode or substrate layer is laminated or disposed over the filled and sealed display cells after the temporary substrate is peeled off without removing the sealing/adhesive or the adhesive layer.

Yet another process comprises (1) preparing an array of display cells on a temporary substrate, (2) filling the display cells, (3) top-sealing the filled display cells, (4) laminating a first electrode or substrate layer onto the filled and sealed display cells without a separate adhesive layer, and optionally (5) curing or hardening the top-sealing/adhesive layer. In this process, the top-sealing layer may be formed from a top-sealing composition as disclosed in the co-pending applications identified above or a top-sealing composition of the present invention. In the latter case, the top-sealing layer also serves as an adhesive layer. Optionally an adhesive layer of the present invention may be coated on the filled and top-sealed display cells or on the temporary substrate before lamination. When converting such a semi-finished display panel to a finished display panel, a second electrode or substrate layer pre-coated with an adhesive layer of the present invention is laminated or disposed over the filled and top-sealed display cells (on the side opposite from the sealing layer) after the temporary substrate is peeled off.

Alternatively, the semi-finished panel may comprise an array of filled and top-sealed display cells sandwiched between two temporary substrates. The filled and top-sealed cells are formed on the first temporary substrate. In one embodiment, the filled cells are top-sealed with a top-sealing composition of the present invention and laminated onto the second temporary substrate. In a second embodiment, an adhesive composition of the present invention is used to laminate the second temporary substrate onto the filled and top-sealed cells. To convert the semi-finished display panel to a finished display panel, the two temporary substrates are removed and two permanent substrate layers, at least one of which comprises an electrode layer are laminated or disposed over the filled and top-sealed display cells.

In all of the processes described above, instead of lamination, the second substrate or electrode layer may be disposed onto the filled and top-sealed display cells by a method such as coating, printing, vapor deposition, sputtering or a combination thereof to meet the customers' specific needs. A protective overcoat such as an antiglare protective coating or a color filter layer may be applied onto the top-sealed display cells or onto the second electrode layer to further improve the optical or physicomechanical properties of the finished panel.

Figure 2:
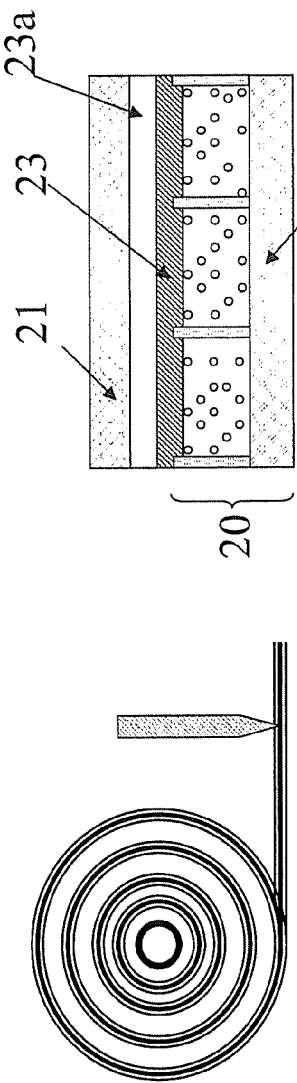
FIG. 2 depicts a typical jumbo roll of a semi-finished display panel with temporary substrate and a finished active matrix display prepared by a process comprising peeling off the temporary substrate and subsequently laminating the panel onto a second substrate or electrode layer such as a thin film transistor (TFT).
Figure 2:
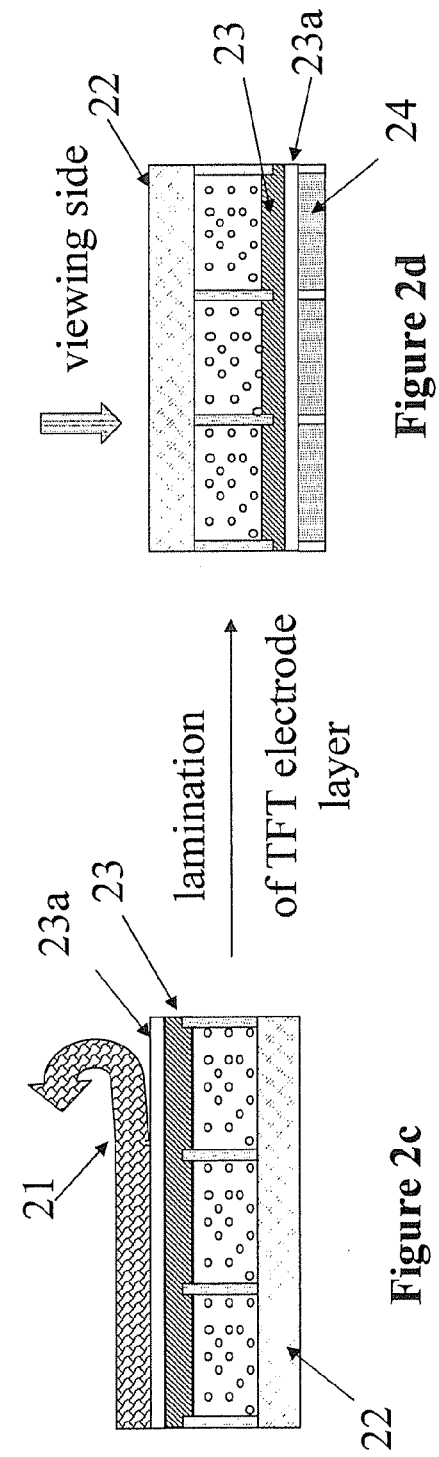

The conversion of a semi-finished panel to a finished display panel is illustrated in FIG. 2. FIG. 2a depicts a roll of semi-finished display panel. FIG. 2b depicts a cross-sectional view of a semi-finished display panel comprising an array of filled and sealed display cells (20) sandwiched between a temporary substrate (21) and a first electrode layer or substrate (22). The temporary substrate (21) is laminated over the top-sealing/adhesive layer (23) of the present invention, optionally with an additional adhesive layer (23a) of the present invention. FIG. 2c depicts that the temporary substrate (21) is peeled off without removing the adhesive (23a) or top-sealing/adhesive layer (23). In FIG. 2d, a second electrode layer (24, such as a TFT back plane) is laminated onto the array of the filled and top-sealed display cells. Alternatively, a substrate or electrode layer may be disposed onto the top-sealed microcups by a method such as coating, printing, vapor deposition, sputtering or a combination thereof to meet the customers' specific needs.

In FIG. 2d, the first substrate or electrode layer (22) is the viewing side whereas the second electrode layer (such as a TFT backplane, 24) laminated onto the filled and top-sealed display cells is the non-viewing side. It is also possible to view from the other side (24) if a transparent second electrode layer (24) is used.

The hardening or curing of the top-sealing/adhesive (23) or adhesive layer (23a) may be accomplished by exposure to radiation or UV through the second substrate (24). The resultant device may be further post cured by heat or other curing mechanisms. Alternatively, the hardening of the adhesive may be carried out by (i) activating by heat or radiation a catalyst or photoinitiator in the top-sealing/adhesive (23) or adhesive layer (23a) of a semi-finished display panel before or after the temporary substrate is peeled off, (ii) laminating the activated semi-finished panel structure without the temporary substrate onto the second substrate or electrode layer (24) and optionally (iii) post curing the finished display panel by heat or radiation. This alternative process is particularly useful when the second substrate or electrode layer is opaque to radiation or UV. The exposure to radiation may also be accomplished through the first substrate or electrode layer optionally with the electric field turned on to reduce the optical hiding effect of the electrophoretic fluid.

The present invention is also directed to a method for improving the physicomechanical and electro-optical properties of an electrophoretic or liquid crystal device or display which method comprises forming on top of the display fluid a top-sealing layer which comprises a high dielectric polymer or oligomer and a radiation or UV curable composition.

The invention is also directed to a method for improving the physicomechanical and electro-optical properties of an electrophoretic or liquid crystal device or display which method comprises adhering one element (e.g., an array of filled and top-sealed display cells) in the display to another element (e.g., an electrode or substrate layer) with an adhesive composition which comprises a high dielectric polymer or oligomer and a radiation or UV curable composition.

Another aspect of the invention is directed to the use of a high dielectric polymer or oligomer and a radiation curable composition as the top-sealing or adhesive layer to improve the physicomechanical and electro-optical properties of an electrophoretic or liquid crystal device or display.

EXAMPLES

The following examples are given to enable those skilled in the art to more clearly understand and to practice the present invention. They should not be considered as limiting the scope of the invention, but merely as being illustrative and representative thereof.

TABLE 2

GLOSSARY

| Acronym | Full Name | Description |
| --- | --- | --- |
| IP9820-20 | IROSTIC P 9820-20 | Hydroxyl terminated polyester polyurethane, Huntsman Polyurethane, Viscosity 1800-2200 cps at 20° C. Tg: −48° C., Huntsman Polyurethane. |
| IS9815-20 | IROSTIC S 9815-20 | Hydroxyl terminated polyester polyurethane, Huntsman Polyurethane, Viscosity 1800-2000 cps at 20° C. Tg: −48° C.; Huntsman Polyurethane. |
| CAPA 6801 | CAPA 6801 | Hydroxyl terminated polycaprolactone, Tri-Iso Company |
| CAB-551-0.2 | CAB-551-0.2 | Cellulose acetate butyrate, Eastman Chemicals Company |
| B-98 | B-98 | Polyvinyl butyral, Solutia. |
| E-8301 | Ebecryl 8301 | Hex functional UV curable acrylated urethane oligomer; MW = 1000, Viscosity 200 cps. UCB Chemical Corp. |
| E-1290 | Ebecryl 1290 | Hex functional UV curable acrylated urethane oligomer; MW = 1000, Viscosity 2000 cps. UCB Chemical Corp. |
| E-8807 | Ebecryl 8807 | Bi-functional UV curable acrylated urethane oligomer. Viscosity 7200 cps at 60° C. MW = 1500; Tg 32° C. UCB Chemical Corp. |
| Eb-810 | Ebecryl 810 | UV curable polyester oligomer; UCB Chemical Corp. |
| Eb-1360 | Ebecryl 1360 | UV curable silicone oligomer; UCB Chemical Corp. |
| CN983 | CN983 | Bi-functional UV curable acrylated urethane oligomer. Viscosity 5000 cps at 60° C. Tg 90° C. SARTOMER. |
| Loctite 3335 | Loctite 3335 | Single component epoxy based adhesive Loctite Corporation |
| DN-100 | DESMODUR N-100 | HDI, aliphatic poly triisocyanate, NCO content: 22.1-22%; Bayer. |
| K-KAT348 | K-KAT348 | Bismium carboxylate 2-ethylhexane acid; King Industry |
| PI-369 | IRGACURE369 | Photo initiator. CiBa Specialty Chemicals Corp. |
| PI-907 | IRGACURE 907 | Photo initiator; CiBa Specialty Chemicals Corp. |
| Cyracure UVI-6974 | Cyracure ™ photoinitiator UVI-6974 | Photoinitiator Union Carbide Corporation |
| Orasol Blue GL | Solvent Blue 70 | Phthalocyanine dye Ciba Specialty Chemicals, Switzerland |
| MEK | Methylethylketone | Solvent, Aldrich |
| IPAc | Isopropyl acetate | Solvent, Aldrich |
| CHO | Cyclohexanone | Solvent, Aldrich |
| MIBK | Methyl isobutyl ketone | Solvent, Aldrich |

Preparation 1

Preparation of Microcup Arrays

Preparation 1A Primer Coated Transparent Conductor Film

A primer coating solution containing 33.2 gm of EB 600™ (UCB, Smyrna, Ga.), 16.12 gm of SR 399™ (Sartomer, Exton, Pa.), 16.12 gm of TMPTA (UCB, Smyrna, Ga.), 20.61 gm of HDODA (UCB, Smyrna, Ga.), 2 gm of Irgacure™ 369 (Ciba, Tarrytown, N.Y.), 0.1 gm of Irganox™ 1035 (Ciba), 44.35 gm of poly(ethyl methacrylate) (MW. 515,000, Aldrich, Milwaukee, Wis.) and 399.15 gm of MEK was mixed thoroughly and coated onto a 5 mil transparent conductor film (ITO/PET film, 5 mil OC50 from CPFilms, Martinsville, Va.) using a #4 drawdown bar. The coated ITO film was dried in an oven at 65° C. for 10 minutes, and exposed to 1.8 J/cm² of UV light under nitrogen using a UV conveyer (DDU, Los Angles, Calif.).

Preparation 1B Preparation of Microcups

TABLE 3

Microcup Composition

| Component | Weight Part | Source |
| --- | --- | --- |
| EB 600 | 33.15 | UCB |
| SR 399 | 32.24 | Sartomer |
| HDDA | 20.61 | UCB |
| EB1360 | 6.00 | UCB |
| Hycar X43 | 8.00 | B F Goodrich |
| Irgacure 369 | 0.20 | Ciba |
| ITX | 0.04 | Aldrich |
| Antioxidant Ir1035 | 0.10 | Ciba |

33.15 Gm of EB 600™ (UCB, Smyrna, Ga.), 32.24 gm of SR 399™ (Sartomer, Exton, Pa.), 6 gm of EB1360™ (UCB, Smyrna, Ga.), 8 gm of Hycar 1300×43 (reactive liquid polymer, Noveon Inc. Cleveland, Ohio), 0.2 gm of Irgacure™ 369 (Ciba, Tarrytown, N.Y.), 0.04 gm of ITX (Isopropyl-9H-thioxanthen-9-one, Aldrich, Milwaukee, Wis.), 0.1 gm of Irganox™ 1035 (Ciba, Tarrytown, N.Y.) and 20.61 gm of HDDA (1,6-hexanediol diacrylate, UCB, Smyrna, Ga.) were mixed thoroughly with a Stir-Pak mixer (Cole Parmer, Vernon, Ill.) at room temperature for about 1 hour and debubbled by a centrifuge at 2000 rpm for about 15 minutes.

The microcup composition was slowly coated onto a 4"×4" electroformed Ni male mold for an array of 72 μm (length)× 72 μm (width)×35 μm (depth)×13 μm (width of top surface of the partition wall between cups) microcups. A plastic blade was used to remove excess of fluid and gently squeeze it into "valleys" of the Ni mold. The coated Ni mold was heated in an oven at 65° C. for 5 minutes and laminated with the primer coated ITO/PET film prepared in Preparation 1A, with the primer layer facing the Ni mold using a GBC Eagle 35 laminator (GBC, Northbrook, Ill.) preset at a roller temperature of 100° C., lamination speed of 1 ft/min and the roll gap at "heavy gauge". A UV curing station with a UV intensity of 2.5 mJ/cm² was used to cure the panel for 5 seconds. The ITO/PET film was then peeled away from the Ni mold at a peeling angle of about 30 degree to give a 4"×4" microcup array on ITO/PET. An acceptable release of the microcup array from the mold was observed. The thus obtained microcup array was further post-cured with a UV conveyor curing system (DDU, Los Angles, Calif.) with a UV dosage of 1.7 J/cm².

Preparation 2A

Preparation of $R_f$-Amine

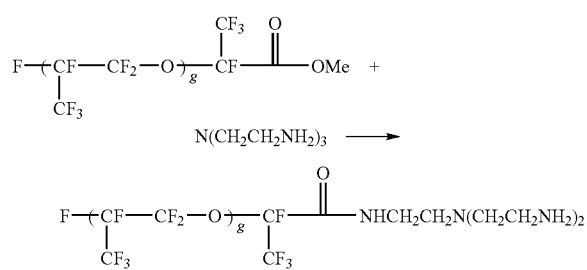

17.8 Gm of Krytox® methyl ester (DuPont, MW=about 1780, g=about 10) was dissolved in a solvent mixture containing 12 gm of 1,1,2-trichlorotrifluoroethane (Aldrich) and 1.5 gm of α,α,α-trifluorotoluene (Aldrich). The resultant solution was added drop by drop into a solution containing 7.3 gm of tris(2-aminoethyl)amine (Aldrich) in 25 gm of α,α,α-trifluorotoluene and 30 gm of 1,1,2-trichlorotrifluoroethane over 2 hours with stirring at room temperature. The mixture was then stirred for another 8 hours to allow the reaction to complete. The IR spectrum of the crude product clearly indicated the disappearance of C=O vibration for methyl ester at 1780 cm⁻¹ and the appearance of C=O vibration for the amide product at 1695 cm⁻¹. Solvents were removed by rotary evaporation followed by vacuum stripping at 100° C. for 4-6 hours. The crude product was then dissolved in 50 mL of PFS2 solvent (perfluoropolyether from Ausimont) and extracted with 20 mL of ethyl acetate three times, then dried to yield 17 gm of purified product ($R_f$-amine1900) which showed excellent solubility in HT-200.

Other reactive $R_f$ amines having different molecular weights such as $R_f$-amine4900 (g=about 30), $R_f$-amine2000 (g=about 11), $R_f$-amine800 (g=about 4) and $R_f$-amine650 (g=about 3) may also be synthesized according to the same procedure.

Preparation 2B

Preparation of Electrophoretic Fluid 9.05 Gm of Desmodur® N3400 aliphatic polyisocyanate (from Bayer AG) and 0.49 gm of triethanolamine (99%, Dow) were dissolved in 3.79 gm of MEK. To the resultant solution, 13 gm of $TiO_2$ R706 (DuPont) was added and homogenized for 2 minutes with a rotor-stator homogenizer (IKA ULTRA-TURRAX T25, IKA WORKS) at ambient temperature. A solution containing 1.67 gm of 1,5-pentanediol (BASF), 1.35 gm of polypropylene oxide (mw=725 from Aldrich), 2.47 gm of MEK and 0.32 gm of a 2% dibutyltin dilaurate (Aldrich) solution in MEK was added and further homogenized for 2 minutes. In the final step, 0.9 gm of $R_f$-amine 4900 prepared in Preparation 2A, in 40.0 gm of HT-200 (Ausimont) was added and homogenized for 2 minutes, followed by addition of additional 0.9 gm of $R_f$-amine 4900 in 33.0 gm of HT-200 and homogenization for 2 minutes. A $TiO_2$-containing microparticle dispersion with low viscosity was obtained.

The microparticle dispersion obtained was heated at 80° C. overnight and stirred under low shear to post-cure the particles. The resultant microcapsule dispersion was filtered through a 400-mesh (38 micrometer) screen and the solid content of the filtered dispersion was measured to be 29% by weight with an IR-200 Moisture Analyzer (Denver Instrument Company).

The average particle size of the filtered dispersion was measured with the Beckman Coulter LS230 Particle Analyzer to be about 1~2 μm.

Preparation 3

Filling and Top-Sealing Microcups

1 Gm of an electrophoretic fluid containing 6% by weight (dry weight) of the $TiO_2$-containing microparticles prepared according to Preparation 2 and 1.3% by weight of a perfluorinated Cu-phthalocyanine dye (CuPc-$C_8F_{17}$) in HT-200 (Ausimont) was filled into the 4"×4" microcup array prepared from Preparation 1B using a #0 drawdown bar. The excess of fluid was scraped away by a rubber blade.

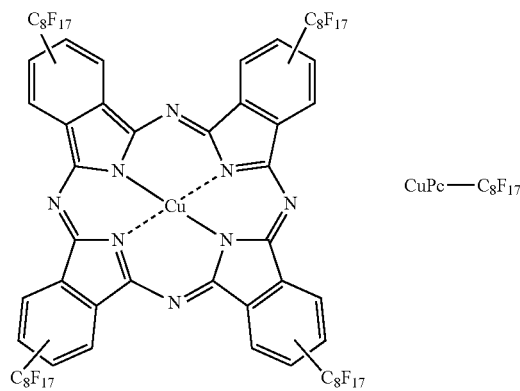

A sealing composition as described in each example below was then overcoated onto the filled microcups using a Universal Blade Applicator with a targeted thickness of about 5~6 microns. The top-sealed microcup array was hardened as specified in each Example below.

Preparation 4

Lamination of Electrode Layer

Unless specified in each Example below, a second 5 mil ITO/PET layer was laminated directly onto the sealed microcups without a separate adhesive layer by a laminator at 120° C. at a linear speed of 20 cm/min.

The contrast ratio of the resultant display was measured by using a GretagMacbeth™ Spectrolino spectrometer with a square electrical waveform at different voltages.

Examples 1-4

Comparative Example 1

A top-sealing/adhesive composition consisting of 13.46 parts (dry) by weight of polyurethane IP9820-20, 0.54 parts (dry) by weight of polyisocyanate DN-100, and 0.14 parts (dry) by weight of catalyst K-KAT348 was dissolved in 43 parts by weight of MEK, 34.4 parts by weight of IPAc, and 8.6 parts by weight of cyclohexanone (CHO), and de-bubbled in a sonic bath for 1 minute before use.

The top-sealing solution was overcoated onto the filled microcups prepared according to the first part of Preparation 3 with a doctor blade, air-dried for 10 minutes and heated in an 80° C. oven for 2 minutes to form a seamless sealing on the filled microcup array. The top-sealed microcup array was laminated directly onto an ITO/PET film (5 mil) as described in Preparation 4, followed by post curing at 80° C. for 60 minutes and continued post curing at 65° C. overnight.

The contrast ratios at 20, 30 and 40 volts were measured to be 5.8, 11.8, and 12.6, respectively.

Example 2

The same procedures of top-sealing and lamination of Comparative Example 1 was followed except that the top-sealing/adhesive composition further comprises 0.7 parts (dry) by weight of a UV curable polyurethane oligomer (CN983) and 0.07 parts (dry) by weight of Irgacure 907.

After lamination, the sample was allowed to be UV cured by passing through a UV conveyer twice at the speed of 10 ft/mm with intensity of 2.56 W/cm$^2$ (which is equivalent to 0.856 J/cm$^2$), followed by post curing at 80° C. for 60 minutes and continued post curing at 65° C. overnight.

The contrast ratios at 20, 30 and 40 volts were measured to be 9.8, 12.6, and 13.8, respectively. The UV curable top-sealing/adhesive composition showed significant improvement in contrast ratios in all voltages tested.

Example 3

The same procedures of sealing and lamination of Comparative Example 1 was followed except that the top-sealing/adhesive composition further comprises 1.4 parts (dry) by weight of a UV curable polyurethane oligomer (CN983) and 0.07 parts (dry) by weight of Irgacure 907. After lamination, the sample was allowed to be UV cured by passing through a UV conveyer twice at the speed of 10 ft/min with intensity of 2.56 W/cm$^2$ (which is equivalent to 0.856 J/cm$^2$), followed by post curing at 80° C. for 60 minutes and continued post curing at 65° C. overnight.

The contrast ratios at 20, 30 and 40 volts were measured to be 12.3, 15.1, and 16.2, respectively. The UV curable top-sealing/adhesive composition showed significant improvement in contrast ratios in all voltages tested.

Example 4

The same procedures of top-sealing and lamination of Comparative Example 1 was followed except that the top-sealing/adhesive composition further comprises 2.8 parts (dry) by weight of a UV curable polyurethane oligomer (CN983) and 0.07 parts (dry) by weight of Irgacure 907. After lamination, the sample was allowed to be UV cured by passing through a UV conveyer twice at the speed of 10 ft/min with intensity of 2.56 W/cm$^2$ (which is equivalent to 0.856 J/cm$^2$), followed by post curing at 80° C. for 60 minutes and continued post curing at 65° C. overnight.

The contrast ratios at 20, 30 and 40 volts were measured to be 11.2, 12.6, and 13.2 respectively. It is evident from Examples 1-4 that all the sealing/adhesive composition comprising a UV curable polyurethane acrylate showed significant improvement in contrast ratios in all voltages tested. It was also found from a peeling test that the adhesion between the top-sealed microcup array and the second ITO/PET layer was improved significantly. The UV curable oligomer/monomer also appeared to significantly improve the contact between the filled/sealed microcups and the second ITO/PET layer.

Examples 5-7

Temperature Latitude

A thermoelectric module was used to control the operating temperature of the display for the temperature latitude study at ±20V, 0.2 Hz. An incoming light from an optical fiber cable was illuminated onto the display sample at 45° angle. The reflecting light was collected at 90° angle (normal to the display surface) and the signal detected by a photoelectric detector was displayed on the screen of an oscilloscope. The optical signal intensities at various operation temperatures from 20° C. to 80° C. were recorded and normalized to the signal measured at 20° C.

Comparative Example 5

A top-sealing/adhesive composition consisting of 12.48 parts (dry) by weight of polyurethane IP9820-20, 0.52 parts (dry) by weight of polyisocyanate DN-100, and 0.13 parts (dry) by weight of catalyst K-KAT348 was dissolved in 60.8 parts by weight of MEK, 21.7 parts by weight of IPAc, and 4.3 parts by weight of CHO, and de-bubbled in a sonic bath for 1 minute before use.

The procedure of display sample preparation is the same as that of Comparative Example 1. A contrast ratio of 11.48 was obtained at 20V/20° C. and the normalized optical signal intensity at 20, 50 and 80° C. were measured to be 100, 86, and 78, respectively.

Example 6

The same procedures of top-sealing and lamination of Comparative Example 5 was followed except that the top-sealing/adhesive composition further comprises 1.95 parts (dry) by weight of a UV curable polyurethane oligomer (E8807) and 0.09 parts (dry) by weight of Irgacure 907. After lamination, the sample was allowed to be UV cured by passing through a UV conveyer twice at the speed of 10 ft/min with intensity of 2.56 W/cm$^2$ (which is equivalent to 0.856 J/cm$^2$), followed by post curing at 80° C. for 60 minutes and continued post curing at 65° C. overnight.

A contrast ratio of 11.0 was obtained at 20V/20° C. Although the contrast ratio was comparable to that of Comparative Example 5, a significant improvement in temperature latitude was achieved by incorporating the radiation curable ingredients in the sealing/adhesive composition. The normalized optical signal intensity at 20, 50 and 80° C. were measured to be 100, 96, and 90, respectively.

Example 7

The same procedures of top-sealing and lamination of Comparative Example 5 was followed except that the top-sealing/adhesive composition further comprises 2.6 parts (dry) by weight of a UV curable polyurethane oligomer (CN983) and 0.09 parts (dry) by weight of Irgacure 907. After lamination, the sample was allowed to be UV cured by passing through a UV conveyer twice at the speed of 10 ft/min with intensity of 2.56 W/cm$^2$ (which is equivalent to 0.856 J/cm$^2$), followed by post curing at 80° C. for 60 minutes and continued post curing at 65° C. overnight.

A contrast ratio of 10.7 was obtained at 20V/20° C. Although the contrast ratio was comparable to that of Comparative Example 5, a significant improvement in temperature latitude was achieved by incorporating the radiation curable ingredients in the top-sealing/adhesive composition. The normalized optical signal intensity at 20, 50 and 80° C. were measured to be 100, 98, and 100, respectively.

It is evident from Examples 5~7 that all the sealing/adhesive composition comprising a UV curable polyurethane acrylate showed significantly wider operation temperature latitude. It was also found from a peeling test that the adhesion between the sealed microcup array and the second ITO/PET layer was improved significantly.

Examples 8-11

Temperature Latitude, Green Time and High Speed Hardening Process

Comparative Example 8

A top-sealing/adhesive composition containing of 15 parts (dry) by weight of polyurethane IS9815-20 dissolved in 70 parts by weight of MEK was de-bubbled in a sonic bath for 1 minute before use.

The sealing solution was overcoated onto the filled microcups prepared according to Preparation 3 with a doctor blade, air-dried for 10 minutes and heated in an 80° C. oven for 2 minutes to form a seamless sealing on the filled microcup array. The top-sealed microcup array was laminated directly onto a 5 mil ITO/PET film as described in Preparation 4.

The contrast ratio at 20V/20° C. was too low to be measured by the GretagMacbeth Spectrolino spectrometer, and the normalized optical signal intensities at 20, 50 and 80° C. were measured to be 100, 24, and 10, respectively.

Example 9

A top-sealing/adhesive composition consisting of 9.1 parts (dry) by weight of polyurethane IS9815-20, 3.9 parts by weight of CN983, and 0.08 parts by weight of Irgacure 907 was dissolved in 41.3 parts by weight of MEK, 41.3 parts by weight of IPAc, and 4.3 parts by weight of CHO. The resultant solution was de-bubbled in a sonic bath for 1 minute before use.

The procedure of display sample preparation is the same as that of Comparative Example 8. After lamination, the sample was further UV cured by passing through a UV conveyer twice at the speed of 10 ft/min with a UV intensity of 2.56 W/cm$^2$ (which is equivalent to 0.856 J/cm$^2$).

Significant improvements in both contrast ratio and temperature latitude were achieved by incorporating the UV curable ingredients in the top-sealing/adhesive layer. A contrast ratio of 11.0 at 20V/20° C. and normalized optical signal intensities of 100, 83, and 62 were obtained at 20, 50 and 80° C., respectively.

Example 10

The same procedures of Example 9 were followed except that the top-sealing/adhesive solution was replaced by a solution containing 10.4 parts (dry) by weight of IS9815-20, 2.8 parts (dry) by weight of E8301, 0.08 parts (dry) by weight of Irgacure 907, 41.3 parts by weight of MEK, 41.3 parts by weight of IPAc, and 4.3 parts by weight of CHO.

Significant improvements in both contrast ratio and temperature latitude were achieved by incorporating the UV curable ingredients in the top-sealing/adhesive layer. A contrast ratio of 12.0 at 20V/20° C. and normalized optical signal intensities of 100, 86, and 66 were obtained at 20, 50 and 80° C., respectively.

Example 11

The same procedures of Example 9 were followed except that the top-sealing/adhesive solution was replaced by a solution containing 9.75 parts (dry) by weight of IS9815-20, 2.6 parts (dry) by weight of CN983, 0.65 parts by weight of E8301, 0.04 parts (dry) by weight of Irgacure 907, 0.04 parts by weight of Irgacure 369, 41.3 parts by weight of MEK, 41.3 parts by weight of IPAc, and 4.3 parts by weight of CHO.

Significant improvements in both contrast ratio and temperature latitude were achieved by incorporating the UV curable ingredients in the sealing/adhesive layer. A contrast ratio of 11.7 at 20V/20° C. and normalized optical signal intensities of 100, 91, and 87 were obtained at 20, 50 and 80° C., respectively.

It is evident from Examples 8~11 that all the top-sealing/adhesive composition comprising a UV curable polyurethane acrylate showed a significant wider operation temperature latitude. It was also found from a peeling test that the adhesion between the sealed microcup array and the second ITO/PET layer was improved significantly. No detectable change in the rheology properties of the sealing solution was found after several days. Moreover, no time-consuming thermal post curing was needed for Examples 9~11 in which the hardening of the sealing layer after lamination could be completed at a conveyer speed of 10 ft/min.

Examples 12-13

Semi-Finished Display Panels

Example 12

Radical Type of UV Curable Adhesive and Sealing Layers

A top-sealing solution containing 11.9 parts (dry) by weight of polyurethane IS9815-20, 2.1 parts by weight of CN983, 0.1 parts by weight of Irgacure 907, 40.8 parts by weight of MEK, and 40.8 parts by weight of IPAC, and 4.3 parts by weight of CHO was prepared and de-bubbled in a sonic bath for 1 minute before use. A microcup array was filled and top-sealed as described in Comparative Example 1. The targeted (dry) thickness of the sealing layer was about 3~4 microns.

The top-sealed microcup array was cut into identical two pieces. One of them was laminated directly onto an ITO/PET film (5 mil) as described in Preparation 4. After lamination, the sample was allowed to be UV cured by passing through a UV conveyer twice at the speed of 10 ft/min with intensity of 2.56 W/cm$^2$ (which is equivalent to 0.856 J/cm$^2$). This piece was used as control in performance evaluation. The contrast ratios at 10, 20, 30 and 40 volts were measured to be 4, 8, 15, and 15, respectively.

The other half of the top-sealed microcup array was used to prepare the semi-finished display panel structure. It was laminated first with a 3M 5002 temporary substrate and cured in a UV conveyor (DDU, Los Angles, Calif., dosage: 1.712 J/cm$^2$) at room temperature. The temporary substrate was removed after the UV exposure.

An adhesive composition containing 4.0 parts (dry) by weight of polyurethane IP9820-15, 1 part by weight of Ebercry 1290, 0.075 parts by weight of Irgacure 907, 85.5 parts by weight of MEK, and 9.5 parts by weight of CHO was mixed thoroughly and sonicated for 5 minutes before use. The solution was coated with a #12 wired rod (targeted thickness of about 1.5 microns) onto a 3M 5002 temporary substrate and dried in an oven at 65° C. for 10 min.

The sandwich structure of temporary substrate/adhesive/top-sealed microcup array was prepared by laminating the adhesive coated temporary substrate onto the filled and sealed microcup array at 80° C.

The resultant sandwich structure and an ITO/glass plate were preconditioned at 80° C. for at least 2 min. To complete the EPD assembly, the temporary substrate was removed from the sandwich structure and the top-sealed microcup array/adhesive was subsequently laminated onto the ITO/glass plate at 80° C. The EPD panel was further post cured from the ITO/glass side using a DDV UV conveyor system with a dosage of 0.86 J/cm$^2$. The contrast ratios driven at 10, 20, 30, and 40 volts were measured to be 5, 12, 15, and 15, respectively. The additional adhesive layer in the semi-finished display panel resulted in a better lamination quality with a slightly better display panel performance deterioration, particularly at low voltage driving. Moreover, the release/adhesive/top-sealed microcups has shown satisfactory lamination properties even after the sandwich structure of temporary substrate/adhesive/top-sealed microcup array was aged at 40° C. for more than a week.

Example 13

Cationic UV Curable Adhesive

A top-sealing solution containing 14.26 parts (dry) by weight of polyurethane IS9815-20, 0.59 parts by weight of DN100, 0.15 parts by weight of catalyst K-KAT348, 57.05 parts by weight of MEK, and 27.95 parts of IPAc was prepared and de-bubbled in a sonic bath for 1 minute before use. A microcup array was filled and top-sealed as described in Comparative Example 1. The targeted (dry) thickness of the sealing layer was about 3~4 microns.

The top-sealed microcup array was cut into identical two pieces. One of them was laminated directly onto an ITO/PET film (5 mil) as described in Preparation 4. After lamination, the sample was post cured for 1 hour in an oven at 80° C. followed by 12 hours at 65° C. This piece was used as control in performance evaluation. The contrast ratios at 10, 20, 30 and 40 volts were measured to be 5, 8, 9 and 9, respectively.

The other half of the top-sealed microcup array was used to prepare the semi-finished display panel structure.

An adhesive composition containing 5.97 parts (dry) by weight of polyurethane IS9820-15, 3.98 parts by weight of Loctite 3335, 0.52 parts by weight of Cyracure UVI-6974, and 89.53 parts by weight of MEK, was mixed thoroughly and sonicated for 5 minutes before use. The solution was coated with a #6 wired rod (targeted thickness of about 1.5 microns) onto a 3M 5002 temporary substrate and dried in an oven at 65° C. for 10 min.

A sandwich structure of temporary substrate/adhesive/top-sealed microcup array was prepared by laminating the adhesive coated temporary substrate onto the filled and sealed microcup array at 120° C.

The resultant sandwich structure and an ITO/glass plate were preconditioned at 80° C. for at least 2 min. To complete the EPD assembly, the temporary substrate was removed from the sandwich structure and the top-sealed microcup array/adhesive was exposed to 1.08 J/cm2 of UV light in a DDV UV conveyor, stored in open air for 30 min, and subsequently laminated onto the ITO/glass plate at 120° C. The resultant EPD panel was further post cured in an oven for 1.5 hours at 80° C., followed by 12 hours at 65° C. The contrast ratios driven at 10, 20, 30, and 40 volts were measured to be 5, 7, 8, and 9, respectively. The additional adhesive layer resulted in a better lamination quality without any significant performance (contrast) deterioration. The release/adhesive/top-sealed microcups have shown satisfactory lamination properties even after the sandwich structure of temporary substrate/adhesive/top-sealed microcup array was aged at 40° C. for more than a week. A green time of more than 12 hours at room temperature plus 30 minutes at 80° C. between the UV exposure step (after the temporary substrate was peeled off from the sandwich) and the subsequent lamination step was also observed.

Example 14

A top-sealing composition consisting of 11.6 parts (dry) by weight of CAPA 6806 (hydroxyl terminated polycaprolactones, from Tri-Iso), 2.3 parts (dry) by weight of a UV curable urethane acrylate oligomer (CN983) and 0.16 parts (dry) by weight of a photoinitiator, Irgacure 907, was dissolved in 82 parts by weight of MEK and de-bubbled in a sonic bath for 1 minute before use.

The sample was subject to continuous switching under an electric field of 1.5 volt/μm under 50° C. and 80% relative humidity. The contrast ratio of the sample was measured for each period of time to monitor the percentage of contrast ratio change throughout the entire switching period. From the test results, almost no degradation in contrast ratio was observed after 40 hours of continuous switching.

Example 15

A top-sealing composition consisting of 5.8 parts (dry) by weight of polyurethane IS9815-20, 5.8 parts (dry) by weight of CAPA 6806, 2.3 parts (dry) by weight of a UV curable urethane acrylate oligomer (CN983) and 0.16 parts (dry) by weight of a photo initiator, Irgacure 907, was dissolved in a mixture of 40.8 parts by weight of MEK, 40.8 parts by weight of IPAc and 4.4 parts by weight of cyclohexanone (CHO), and de-bubbled in a sonic bath for 1 minute before use.

The sample was subject to continuous switching under an electric field of 1.5 volt/μm under 50° C. and 80% relative humidity. The contrast ratio of the sample was measured for each period of time to monitor the percentage of contrast ratio change throughout the entire switching period. From the test results, almost no degradation in contrast ratio was observed after 40 hours of continuous switching.

Example 16

A top-sealing composition consisting of 11.90 parts by (dry) weight of polyurethane IS9815-20, 0.63 parts by (dry) by weight of B-98 (polyvinyl butyral from Solutia), 2.5 parts by (dry) weight of a polyester acrylate UV curable oligomer (Eb810), 0.63 parts by (dry) weight of a silicon acrylate UV curable oligomer (Eb1360) and 0.08 parts by (dry) weight of a photoinitiator, Irgacure 907, was dissolved in 84.26 parts by weight of MEK and de-bubbled in a sonic bath for 1 minute before use.

The contrast ratio and electro-optic response time of the sample were measured. Compared to the sample without B-98, the contrast ratio and response time of EPD were improved.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, materials, compositions, processes, process step or steps, to the objective, spirit and scope of the present invention. All such modifications are intended to be within the scope of the claims appended hereto.

What is claimed is:

1. A display device comprising display cells sandwiched between two electrodes layers, wherein the display cells are:
   (i) filled with a display fluid wherein charged pigment particles are dispersed in a dielectric solvent, and
   (ii) top-sealed with a top-sealing layer formed from a sealing composition comprising a radiation curable composition and a functionalized polyurethane, wherein the functionalized polyurethane has a dielectric constant higher than that of the dielectric solvent and a functional group selected from the group consisting of —OH, —SH, —NCO, —NCS, —NHR, —NRCONHR, —NRCSNHR, vinyl, and epoxide, wherein R is hydrogen or alkyl, aryl, alkylaryl or arylalkyl of up to 20 carbon atoms, wherein the top-sealing layer has a center area and a non-center area, part of the non-center area is adhered to the top portion of the partition wall, the non-center area is thicker than the center area, and the center area is about 1 to about 8 microns in thickness.

2. The display device of claim 1, wherein said radiation curable composition comprises a multifunctional monomer or oligomer.

3. The display device of claim 1, wherein said sealing composition further comprises a crosslinking agent.

4. The display device of claim 3, wherein said sealing composition further comprises a catalyst.

5. The display device of claim 1, further comprising two electrode layers.

6. The display device of claim 1, further comprising an electrode layer and a temporary substrate layer.

7. The display device of claim 1, further comprising a permanent substrate layer and a temporary substrate layer.

8. The display device of claim 1, further comprising two temporary substrate layers.

9. The display device of claim 8, wherein said temporary substrate is a release liner.

10. The display device of claim 6, which is in a form of a roll.

11. The display device of claim 1, wherein said dielectric solvent is a fluorinated dielectric solvent.

12. The display device of claim 5, further comprising a protective coating.

13. The display device of claim 12, wherein said protective coating comprises a particulate additive.

14. The display device of claim 1, wherein said sealing composition has a specific gravity no greater than that of the display fluid.

15. The display device of claim 1, wherein said top-sealing layer is being hardened when in contact with the display fluid.

16. The display device of claim 1, wherein the sealing composition comprises 5-30% of the radiation curable composition and 30-75% of polyurethane, based on dry weight of the top-sealing layer.

17. The display device of claim 1, wherein the functionalized polyurethane is hydroxyl terminated polyester polyurethane, hydroxyl terminated polyether polyurethanes, isocyanate terminated polyester polyurethanes, isocyanate terminated polyether polyurethanes, acrylate terminated polyester polyurethanes, or acrylate terminated polyether polyurethanes.

18. The display device of claim 1, wherein the center area is about 3 to about 6 microns in thickness.

* * * * *